United States Patent
Yamauchi et al.

(10) Patent No.: US 7,780,533 B2
(45) Date of Patent: Aug. 24, 2010

(54) CLIENT TERMINAL FOR EXECUTING MULTIPLAYER APPLICATION, GROUP FORMING METHOD, AND GROUP FORMING PROGRAM

(75) Inventors: Kazuhiko Yamauchi, Osaka (JP);
Yoshiaki Iwata, Osaka (JP); Shigeki Matsunaga, Osaka (JP)

(73) Assignee: Panasonic Corporation, Osaka (JP)

( * ) Notice: Subject to any disclaimer, the term of this patent is extended or adjusted under 35 U.S.C. 154(b) by 460 days.

(21) Appl. No.: 11/659,970

(22) PCT Filed: Aug. 25, 2005

(86) PCT No.: PCT/JP2005/015443
§ 371 (c)(1),
(2), (4) Date: Feb. 12, 2007

(87) PCT Pub. No.: WO2006/025255
PCT Pub. Date: Mar. 9, 2006

(65) Prior Publication Data
US 2007/0207860 A1    Sep. 6, 2007

(30) Foreign Application Priority Data
Aug. 30, 2004 (JP) .............................. 2004-251019

(51) Int. Cl.
*A63F 13/00* (2006.01)
(52) U.S. Cl. .............................. 463/42; 463/29; 463/40
(58) Field of Classification Search .................. 463/29, 463/31, 40, 42; 709/212, 227, 228
See application file for complete search history.

(56) References Cited

U.S. PATENT DOCUMENTS

| | | | |
|---|---|---|---|
| 5,547,202 A | * | 8/1996 | Tsumura ...................... 463/29 |
| 6,023,729 A | * | 2/2000 | Samuel et al. .............. 709/228 |
| 6,345,297 B1 | * | 2/2002 | Grimm et al. ............... 709/227 |
| 6,526,491 B2 | | 2/2003 | Suzuoki et al. |
| 6,809,734 B2 | | 10/2004 | Suzuoki et al. |
| 6,826,662 B2 | | 11/2004 | Suzuoki et al. |
| 7,016,942 B1 | * | 3/2006 | Odom ........................ 709/212 |
| 7,093,104 B2 | | 8/2006 | Suzuoki et al. |
| 7,139,882 B2 | | 11/2006 | Suzuoki et al. |
| 2002/0138637 A1 | | 9/2002 | Suzuoki et al. |

(Continued)

FOREIGN PATENT DOCUMENTS

JP        2003-62350        3/2003

(Continued)

*Primary Examiner*—James S McClellan
(74) *Attorney, Agent, or Firm*—Wenderoth, Lind & Ponack, L.L.P.

(57) ABSTRACT

A given terminal of a plurality of terminals in a network system that also includes a server apparatus, the terminals respectively corresponding to characters that exist in a virtual space. The given terminal including a display unit performing, in accordance with data stored in the sever apparatus and data stored in the given terminal, a display of a scene in the virtual space in which exits a first character whose actions are determined by the given terminal and a second character whose actions are determined by another terminal Further, the given terminal including an updating unit uploading, when a user performs an operation to form a group of characters, the displayed scene, such that performance information pertaining to the other terminal is displayed in correspondence with the second character.

16 Claims, 17 Drawing Sheets

U.S. PATENT DOCUMENTS

| | | | |
|---|---|---|---|
| 2003/0037149 A1* | 2/2003 | Hess | 709/227 |
| 2003/0060285 A1* | 3/2003 | Itakura | 463/42 |
| 2004/0152519 A1* | 8/2004 | Wang et al. | 463/42 |
| 2005/0078117 A1 | 4/2005 | Suzuoki et al. | |
| 2005/0081209 A1 | 4/2005 | Suzuoki et al. | |
| 2005/0081213 A1 | 4/2005 | Suzuoki et al. | |
| 2005/0097302 A1 | 5/2005 | Suzuoki et al. | |
| 2005/0120187 A1 | 6/2005 | Suzuoki et al. | |
| 2005/0120254 A1 | 6/2005 | Suzuoki et al. | |
| 2005/0138325 A1 | 6/2005 | Hofstee et al. | |
| 2005/0160097 A1 | 7/2005 | Gschwind et al. | |
| 2005/0268048 A1 | 12/2005 | Hofstee et al. | |

FOREIGN PATENT DOCUMENTS

| | | |
|---|---|---|
| JP | 2003-281107 | 10/2003 |
| JP | 2003-316737 | 11/2003 |

* cited by examiner

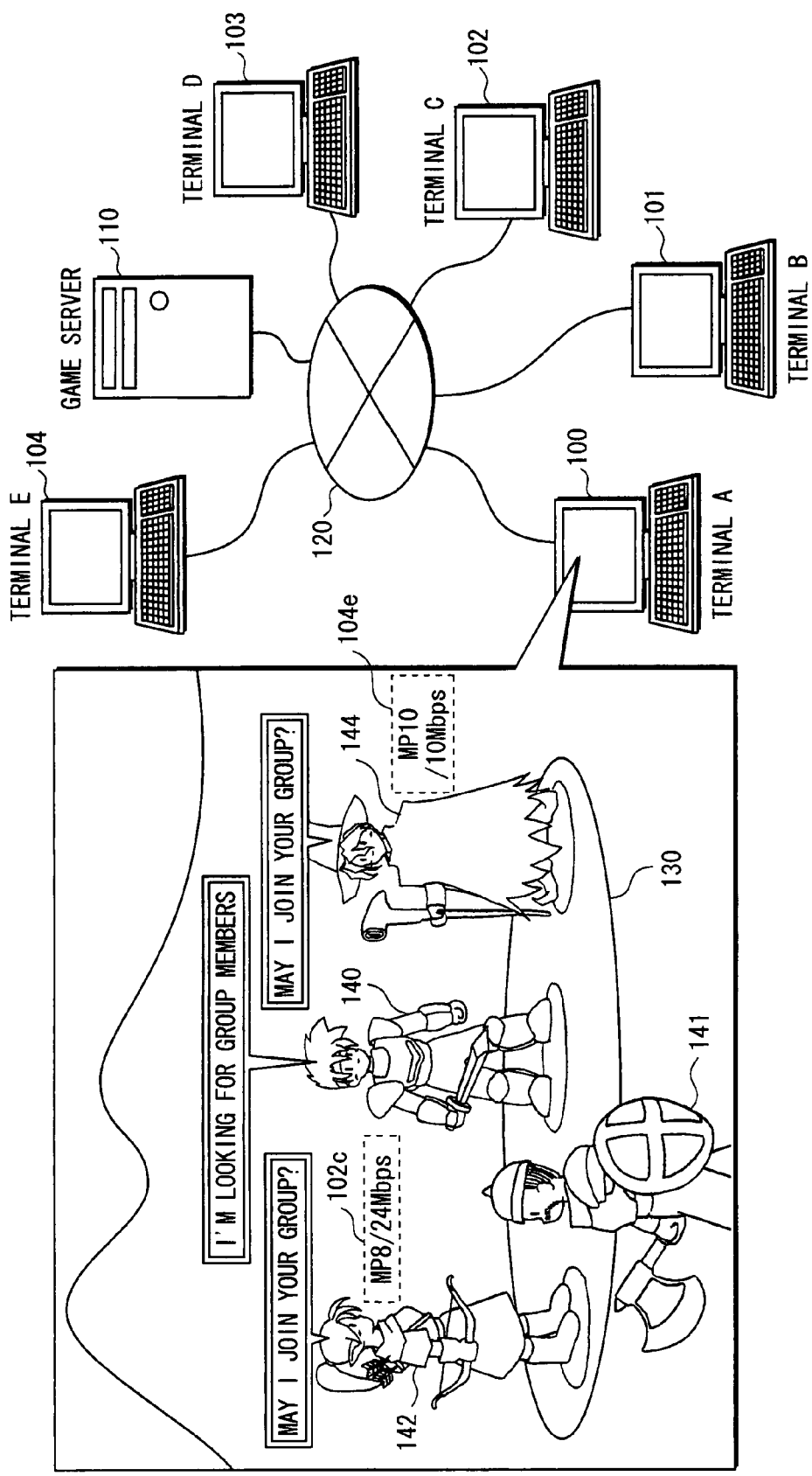

FIG. 2A
```
CHARACTER : A
TYPE : KNIGHT
GRAPHIC TYPE : K2
COORDINATES : X1、Y1
CHARACTER : B
TYPE : WIZARD
GRAPHIC TYPE : W5
COORDINATES : X2、Y2
CHARACTER : C
TYPE : WARRIOR
GRAPHIC TYPE : F1
COORDINATES : X3、Y3
        :
```
FIG. 2B
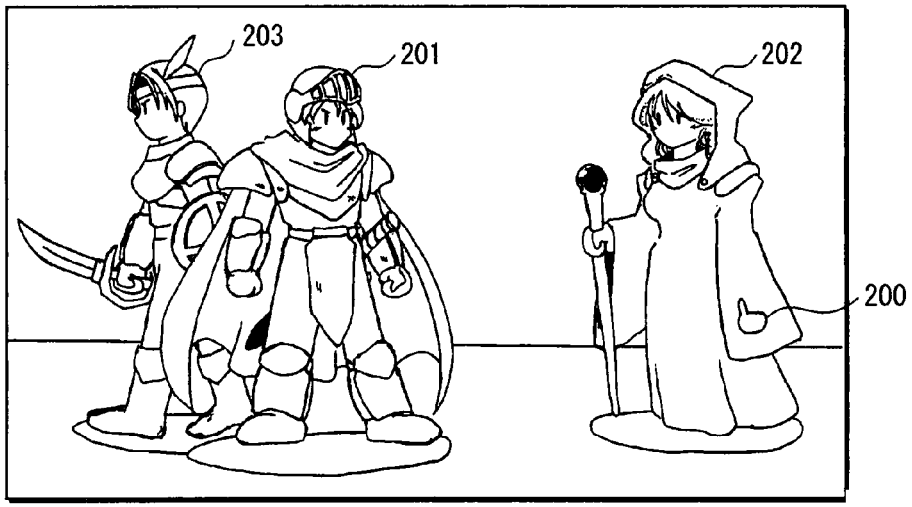
FIG. 2C
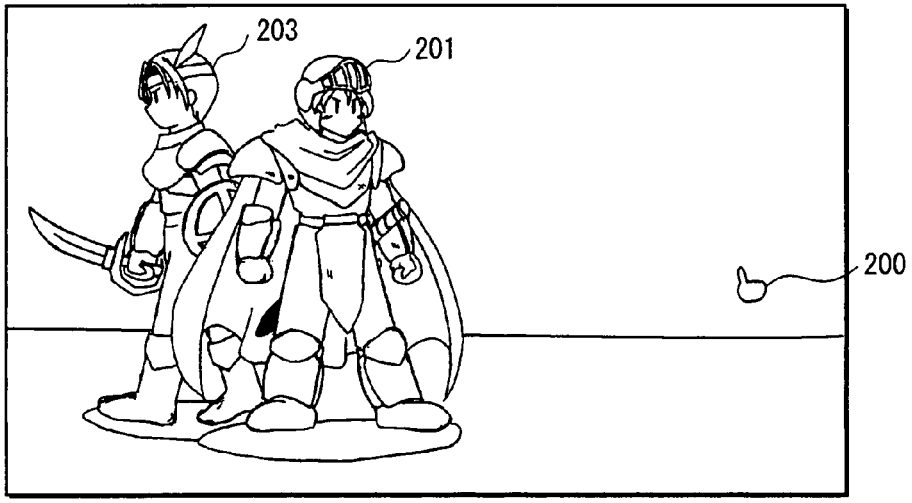

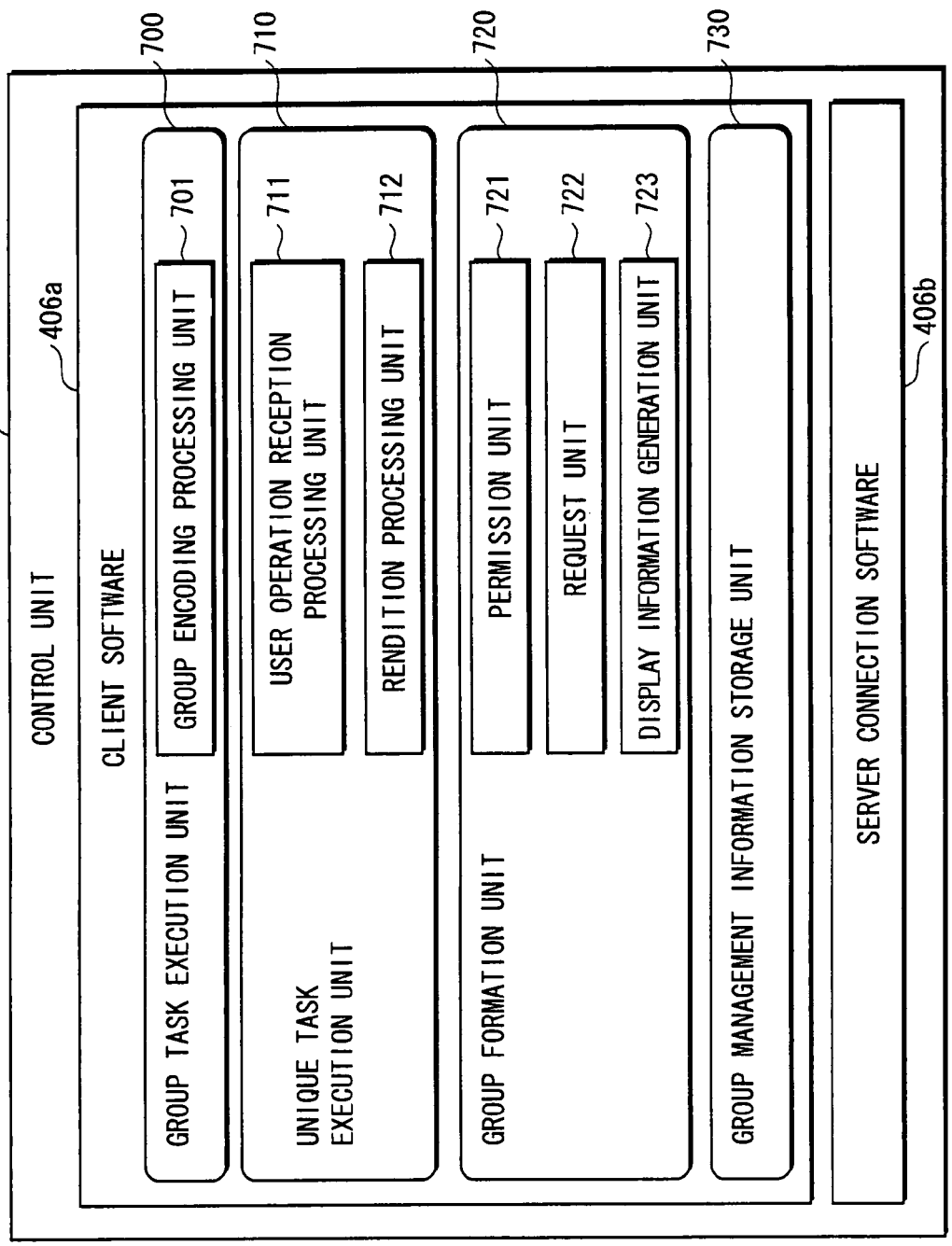

```
CHARACTER NAME : A
ACTION : STATIONARY
COORDINATES : X1, Y1
```

```
CHARACTER NAME : A
ACTION : MOVE TO (X2, Y1)
COORDINATES : X3, Y1
```

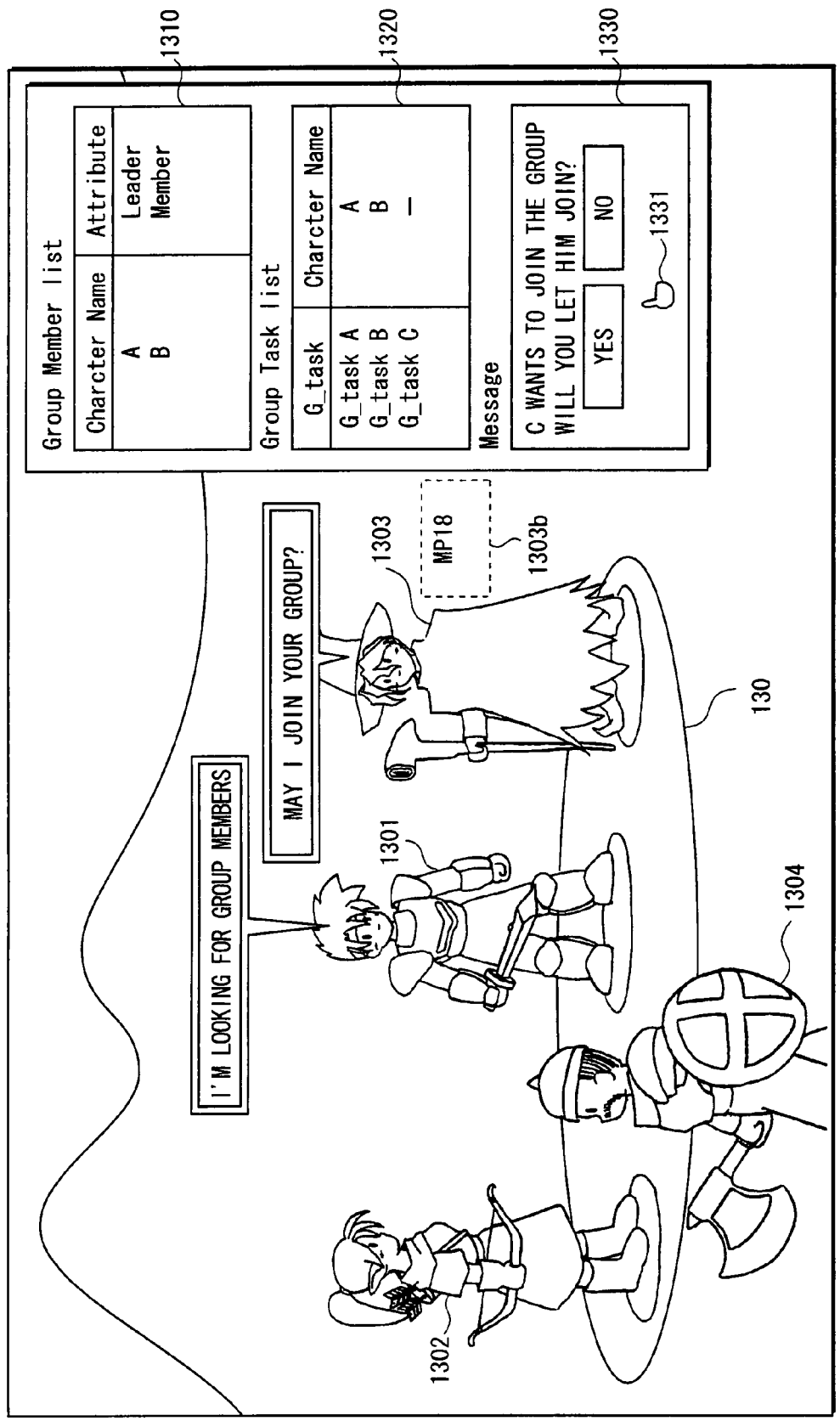

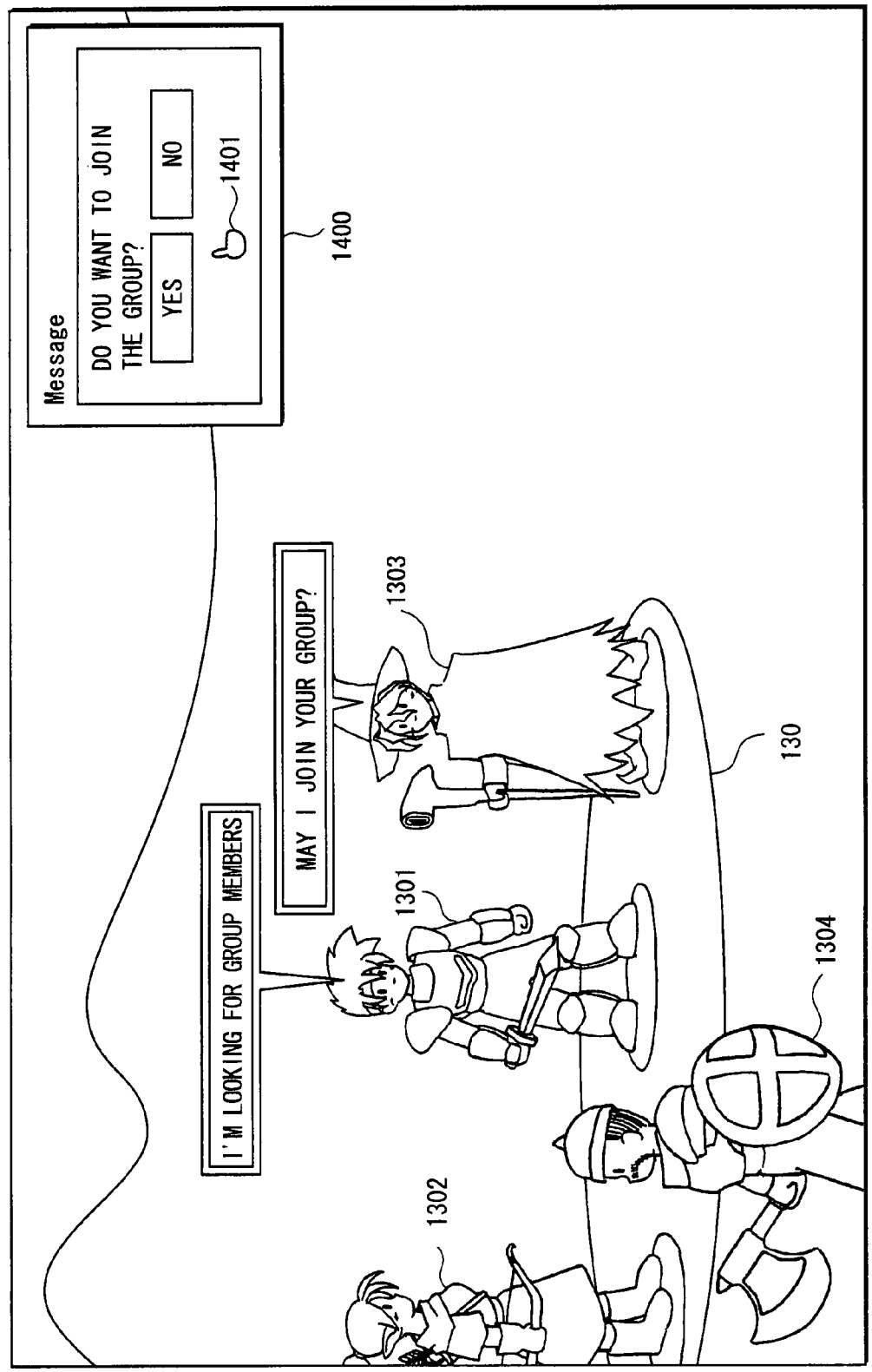

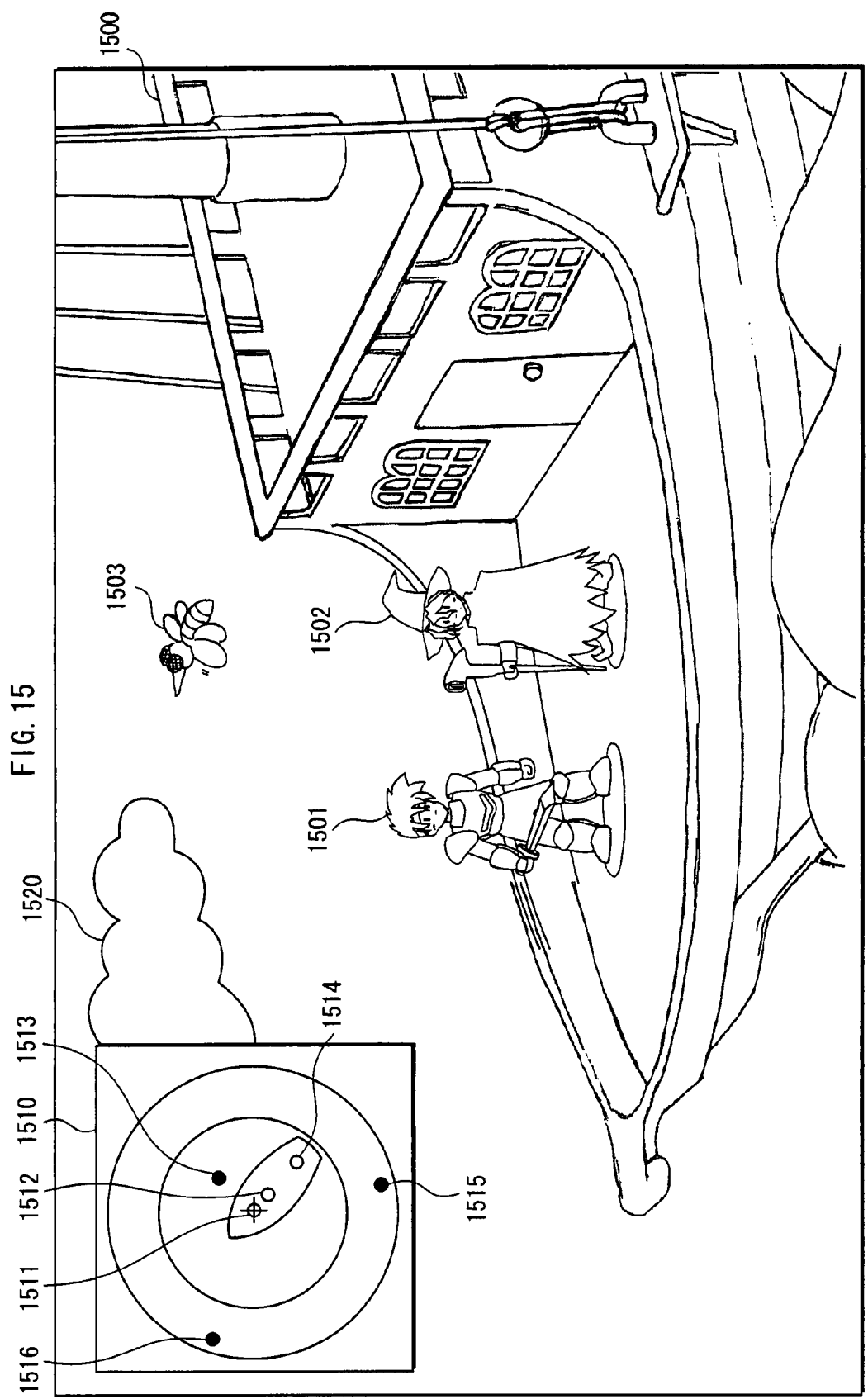

FIG. 16A

| GROUP A | MEMBER MANAGEMENT INFORMATION |
| --- | --- |
| | GROUP TASK MANAGEMENT INFORMATION |

FIG. 16B

| CHARACTER NAME | TERMINAL IDENTIFIER | MEMBER TYPE | PERFORMANCE INFORMATION | ADDRESS INFORMATION |
| --- | --- | --- | --- | --- |
| A | TERMINAL A | LEADER | 19 | ADDRESS INFORMATION A |
| B | TERMINAL B | MEMBER | 15 | ADDRESS INFORMATION B |
| C | TERMINAL C | MEMBER | 18 | ADDRESS INFORMATION C |

FIG. 16C

| TASK IDENTIFIER | DEVICE RESPONSIBLE |
| --- | --- |
| G TASK A | TERMINAL A |
| G TASK B | TERMINAL B |
| G TASK C | SERVER |

FIG. 16D

| TERMINAL A | DATA PROCESSING CAPABILITY | VIDEO PROCESSING CAPABILITY | NETWORK CAPABILITY | OVERALL CAPABILITY |
| --- | --- | --- | --- | --- |
| TOTAL OF EACH CAPABILITY | 10 | 5 | 4 | 19 |
| LOCAL TERMINAL | 5 | 5 | 4 | |
| INTERNAL NETWORK TERMINAL | 2 | 0 | — | |
| EXTERNAL NETWORK TERMINAL | 3 | 0 | — | |

CLIENT TERMINAL FOR EXECUTING MULTIPLAYER APPLICATION, GROUP FORMING METHOD, AND GROUP FORMING PROGRAM

BACKGROUND OF THE INVENTION

1. Field of Invention

The present invention relates to a technique for simultaneously executing a multi-participant application in a plurality of terminals.

2. Description of the Related Art

In recent years, game server and client-type multi-participant applications have become popular. Such applications allow multiple users to participate simultaneously via a network. A typical example of a multi-participant application is a multi-participant online game. A multi-participant online game may be played by several hundred to several thousand users simultaneously.

In a multi-participant online game, each user accesses a game server that provides a game, from a terminal such as his/her personal computer or game machine. The game server encodes and manages information relating to the game which is played with the terminal maintaining a connected state to the game server. This information includes characters manipulated by users, monsters that are enemies of the characters, and landscapes that are backgrounds in the game. Each terminal receives this information from the game server, and performs processing such as rendition processing to render the characters, monsters, and the like. With multi-participant applications that have this form, a plurality of users share one world in a virtual space provided by the game server, and the characters manipulated by the users can converse or exchange items relating to the games with each other. Furthermore, characters in the game can form groups with each other and act together in the virtual space. Although the main purpose of forming a group and acting together with other characters is to more easily reach goals in the game that would be difficult to reach individually, another purpose of forming of groups is to enjoy communication with other group members.

The game server for a multi-participant online game must perform an enormous amount of processing in order to manage dynamic information relating to the contents of operations and the like of multiple users. One way of lightening the load for such processing is distributed computing, and one technique that has been proposed is parallel computing whereby a plurality of computers connected in parallel execute a common application.

BRIEF SUMMARY OF THE INVENTION

However, in an online game, groups are formed by anonymous users who know nothing of each other's circumstances. This means that one or more of the group members may be a character manipulated by a low-performance terminal. If a character manipulated by a low-performance terminal is included in the group members, there is a problem that the low performance will affect users manipulating other characters in the group.

This problem is particularly pronounced in an online game when multiple characters gather in one place in the world of the game. This is because the amount of data that must be processed when multiple characters gather in one place increases, and if a particular terminal has a low rendition processing capability or a low network communication rate, that terminal will fall behind in rendition processing, thus causing a problem that the terminal will not be able to display the scene as it is originally intended to be rendered.

Taking the example shown in FIGS. 2A to 2C, data handled by the game server is encoded as shown in FIG. 2A, and transmitted to the terminals. The terminals should display a character A 201, a character B 202 and a character C 203 as shown in FIG. 2B. However, it is possible that not all of the characters will be displayed if the performance of the terminal is low. One example of this is, as shown in FIG. 2C, character B 202 not being rendered. In this situation, the fact that the user is unable to acknowledge the character B 202 may cause problems such as the user being unable to act with respect to character B, or the user making errors in input.

Failure to achieve an object due to an input error by a group member, despite the group having been formed with the purpose of achieving objects that would be difficult individually, can be said to be defeating the purpose of forming a group. For this reason, there are demands for users to be able to form groups and act with other users that are assumed to be unlikely to make input errors.

An object of the present invention is to provide a terminal that is advantageous for a user when forming a group in a multi-participant application such as an a multi-participant online game.

In order to achieve the stated object, the terminal of the present invention is any given one of a plurality of terminals in a network system that includes the plurality of terminals and a server apparatus, the terminals respectively corresponding to a plurality of characters that exist in a virtual space, the given terminal including: a display unit operable to, in accordance with data stored in the sever apparatus and data stored in the given terminal, perform display of a scene in the virtual space in which at least a first character and a second character exist, the first character being a character whose actions are determined by the given terminal, and the second character being a character whose actions are determined by another terminal; and an updating unit operable to, when a user performs an operation to form a group of characters, update the displayed scene such that performance information pertaining to the other terminal is displayed in correspondence with the second character.

Here, the terminal and the server apparatus execute a multi-participant application, and the terminal renders the scene of the virtual world in accordance with data stored by the terminal and data stored by the server apparatus.

According to the stated structure, a character manipulated by another user (hereinafter, a character manipulated by a user is referred to as a user character) in a scene in the virtual space provided by a multi-participant application such as an online game, and performance information pertaining to a terminal corresponding to the user character. Basically, the performance of the terminal pertains to resources that have little relation to the world of the online game. However, the performance information enables the user to know the level of performance the terminal manipulating the other user character, and therefore enables user characters manipulated by users using high-performance terminals to form a group. High-performance means that the problem of input errors due to a character that should be displayed not being displayed is eliminated to some extent, and therefore that a situation in which an object in the game is not achieved due to input error by another user is eliminated. This works to the advantage of users who wish to form a group.

Referring to FIG. 7, note that the display unit of the present invention is realized by a control unit 505, and in particular by a rendition processing unit 712, both of which are described later. Furthermore, the updating unit is realized by the control unit 505 described later, and in particular by a display information generation unit 723, also described later. Typically, these are performed by writing generated display information to a video memory. The terminal converts the information in the video memory into a video signal of NTSC, RGB and the like, and outputs the video signal. The output video signal is presented as video by an external display device such as a monitor or television. It is sufficient for the display unit and the updating unit of the present invention to generate the display information. Accordingly, the terminal is not limited to being a television or the like having a video display function.

Furthermore, the terminal of the present invention may further include: a group formation unit operable to form the group composed of the first character and the second character; and a reception unit operable to receive performance information pertaining to any of the terminals other than the given terminal, wherein, the received performance information is the performance information pertaining to the other terminal that controls the second character that is requesting to join the group, and the updating unit updates the displayed scene in accordance with the received performance information.

According to the stated structure, in a multi-participant application such as an online game, when a user attempts to form a group with other user characters, the performance information only of terminals controlling user characters wishing to join the group is displayed. Ordinarily, display of performance information would be likely to be thought of as an interference in the progression of the game because the performance of a terminal is a resource that is unrelated to the game. It is when forming a group that a user would want knowledge of the performance of a terminal controlling another user character. Therefore, if performance information is displayed only when a group is being formed, the display of the performance information will not be considered an interference.

Furthermore, the group forming unit may include: a permission sub-unit operable to permit any of the characters that is not already a member of the group to join the group; and a request sub-unit operable to make a request, to any one of the terminals that controls a character requesting to join the group, such that the one terminal that controls the character requesting to join the group transmits performance information pertaining to the one terminal that controls the character requesting to join the group.

According to the stated structure, by viewing the performance of a terminal controlling a user character when forming a group, the user is able to determine whether or not to allow the user character to join the group.

Furthermore, the group formed by the group formation unit may be a set of information that includes character identifiers and terminal identifiers, the character identifiers respectively showing characters that compose the group, and the terminal identifiers respectively showing terminals that control the characters that compose the group.

According to the stated structure, the terminal and the server apparatus are able to distinguish between user characters that are part of the group and user characters that are not part of the group.

Furthermore, the terminal of the present invention may execute a multi-participant application, and may further include: a group task processing unit operable to perform a group task, the group task being processing that, in the multi-participant application, pertains to the group formed by the group formation unit, wherein the group task is performed by the group task processing unit according to distributed processing among the terminals that control the characters that compose the group.

According to the stated structure, terminals controlling user characters participating in a group can use distributed computing to perform processing relating to the group in the game, such as processing relating to where the group members are.

Furthermore, the group task may be processed by, among the terminals that control the characters that compose the group, a terminal having a higher performance.

According to the stated structure, the terminal having the higher performance among terminals controlling group members is entrusted with relatively large processing in the game processing. Therefore, the efficiency and speed of processing in the game are improved. This further enhances the advantages of displaying performance information when forming a group.

Furthermore, when the second character joins the group to which the first character belongs, the updating unit may update the displayed scene such that the second character and the performance information pertaining to the other terminal are displayed with priority over a character that is not requesting to join the group.

Here, "displaying with priority" refers to displaying a character requesting to join the group so that the character stands out from any characters not requesting to join the group. For instance, perspective may be ignored such that the character requesting to join the group is displayed on top of a character not requesting to join the group, or the character requesting to join may be displayed in a highlighted state.

According to the stated structure, a user character requesting to join a group is displayed with priority. There are instances in an online game when several characters crowd together in one place. Therefore, with the stated structure, although perspective may be sacrificed, a user character joining a group, and the performance information of the terminal corresponding to the user character joining the group, can be seen easily.

Furthermore, the updating unit may update the scene such that coordinates at which the performance information is displayed in the virtual space maintain a predetermined relative positional relationship with coordinates at which the second character is displayed in the virtual space.

According to the stated structure, the performance information of a terminal controlling a user character is displayed in association with the user character even if the user character moves. Therefore, the correspondence between the user character and the performance information can be easily recognized even if the user character moves.

Furthermore, the terminal of the present invention further may further include: a storage unit operable to store performance information pertaining to the given terminal; and a transmission unit operable to transmit the stored performance information to another of the terminals in response to a request therefrom.

According to the stated structure, when another user character proposes group formation, the performance information of the given terminal is transmitted to the terminal controlling the user character suggesting group formation.

Furthermore, the performance information may be information showing hardware processing performance of the other terminal.

According to the stated structure, a user is able to know the hardware performance, such as clock and image processing capability, of a terminal controlling a user character.

Furthermore, the performance information may be information showing communication amount per time unit of the other terminal with a network.

According to the stated structure, a user is able to know the communication rate of a terminal with the network. In an online game, data and the like relating to a result of user input is exchanged in real time, and accordingly the data transmission amount per unit of time is highly important. Therefore, it is advantageous for the user to be able to have knowledge about this.

Furthermore, the performance information may be information showing hardware processing performance of the other terminal and communication amount per time unit of the other terminal with a network, and the updating unit may update the displayed scene such that the hardware processing capability and the communication amount are visually distinguishable from each other.

According to the stated structure, a user is able to check the processing capability and network communication amount of a terminal corresponding to a character wishing to join a group, before determining whether or not to admit the character to the group.

Furthermore, the performance information may be information showing hardware performance according to distributed computing of processing between the given terminal and the other terminal.

According to the stated structure, the user is able to know the distributed processing capability of a terminal. Game machines, personal computers and the like such as the present terminal continually improve in performance, and therefore distribution of game processing with other devices is conceivable. If part of the processing of the online game is performed according to distributed processing, it is advantageous for characters of users using terminals having high distributed computing performance to form groups with each other.

Here, the updating unit may update the displayed scene such that the hardware capability of the given terminal and the hardware capability of the other terminal are displayed in respectively different forms.

According to the stated structure, when distributed computing is being performed in a terminal corresponding to a character requesting to join the group, the user is able to check the performance of devices performing distributed computing, to determine whether or not to permit the terminal to join the group.

Furthermore, the other terminal may be either on the network to which the given terminal belongs, or may be on an external network, and the updating unit may update the displayed scene such that the hardware processing capability of the other terminal is displayed differently depending on whether the other terminal is on the network to which the given terminal belongs or on the external network.

The state structure assists in determining which of terminals requesting to join the group to assign distributed computing to.

Furthermore, the network system that includes the server and the given terminal may execute a multi-participant application, the given terminal may be connected via the network to a device that is capable of performing parallel processing, and the terminal may perform user-side processing in the multi-participant application according to distributed computing with the device.

According to the stated structure, when the terminal is connected to a home network and the CPU of a television, DVD player or the like has the capability to perform distributed computing, processing in the online game can be assigned to the television or the DVD player, thus increasing the speed of the processing and making the game more enjoyable.

Furthermore, the present invention may be a group formation method used by any given one of a plurality of terminals to form a group with another terminal, the method including the steps of: a group formation request step of a first character manipulated by the given terminal requesting formation of a group; a reception step of receiving, in response to the request to form the group, performance information pertaining to the other terminal, the other terminal manipulating a second character that has requested to join the group; a display step of displaying the received performance information in correspondence with the second character; and a group joining determination step of determining, with reference to the displayed performance information, whether or not to permit the second character to join the group.

According to the stated method, in a terminal executing a multi-participant online game, a group can be formed with the character of another terminal based on the performance information of the other terminal.

Furthermore, the present invention may be a program that causes a computer that is any given one of a plurality of terminals to execute processing for forming a group in a multi-participant application, the processing including: a group formation request step of a first character manipulated by the given terminal requesting formation of a group; a reception step of receiving, in response to the request to form the group, performance information pertaining to the other terminal, the other terminal manipulating a second character that has requested to join the group; a display step of displaying the received performance information in correspondence with the second character; and a group joining determination step of determining, with reference to the displayed performance information, whether or not to permit the second character to join the group.

By executing this program, a terminal can form a group based on the performance information of another terminal.

BRIEF DESCRIPTION OF THE DRAWINGS

FIG. 1 shows an overview of the system of the present invention;

FIGS. 2A to 2C are for describing a problem that occurs in a conventional online game;

FIG. 7 shows client software and game server software loaded by a control unit of the terminal of the present invention;

FIG. 13 shows a screen rendered by the terminal A when a user character A forms a group;

FIG. 14 shows a screen rendered by terminal C corresponding to a user character C wishing to join a group that when the user character A is forming the group;

FIG. 15 describes a case of a group task being displayed on a screen of a terminal;

FIGS. 16A to 16D shows group management information and detailed performance information of a terminal.

DETAILED DESCRIPTION OF THE INVENTION

Figure 3:
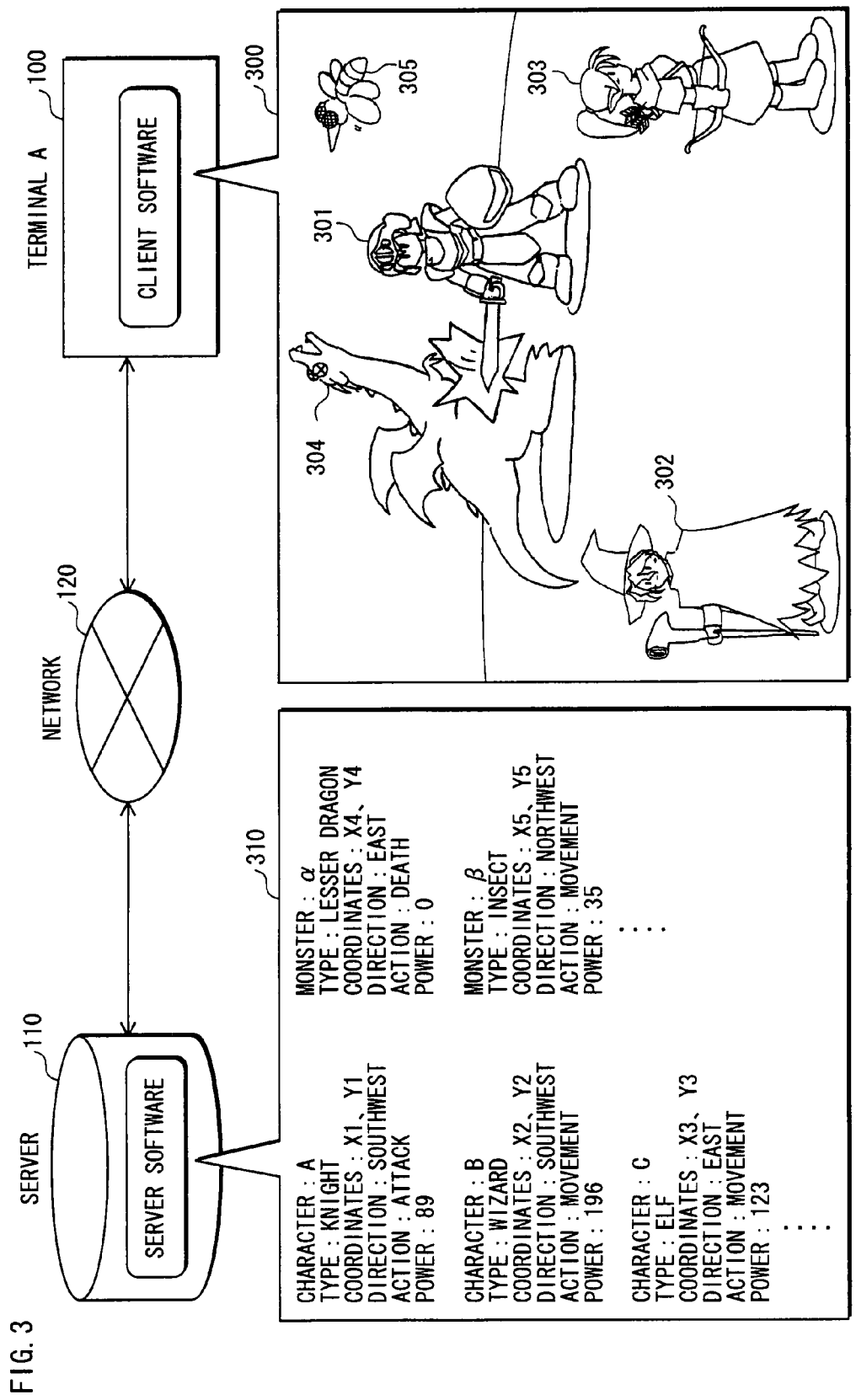
FIG. 3 shows the correspondence between information managed by a game-server and a screen displayed by a terminal in the present invention.

The following describes a preferred embodiment of the present invention with use of the drawings.

FIG. 1 shows an overview of the present invention.

A system of the present invention is composed of a game server (hereinafter referred to as a game server or simply as a server), a plurality of terminals, and a network. The game server 110 is a computer, and each of terminals A100, B101, C102, D103 and E104 is a game machine or a personal computer that has a network connection function. Each user plays a game by manipulating his/her own character using his/her terminal. Each one user terminal corresponds to one character, and only one character can be manipulated from one terminal at onetime. Although only five terminals are shown here, ordinarily several hundred to several thousand terminals execute the application simultaneously, with several hundred to several thousand users playing the game.

Each of the terminals A100 to E104 is accessing the game server 110 via the network 120, and executing the multi-participant application together with the game server 110. The multi-participant application in the present example is assumed to be a conventional RPG (role playing game). In order to obtain client software used in a terminal to play the multi-participant application, a user may, for instance, purchase a disc on which the client software is recorded, or download the client software from the game server. Note that an RPG is a game in which a user manipulates a user character that is an avatar of the user in order to develop a story provided by the application.

The game server 110 receives input contents from each terminal, processes the contents based on the multi-participant application (hereinafter also referred to as the game or the application), and returns data showing the processing result to the terminals.

The screen shown in FIG. 1 is a screen displayed by the terminal A100. User characters 140, 141, 142 and 144 are manipulated by the users of terminals A100, B101, D102 and E104, respectively. The user character corresponding to terminal C is in a range in the game that is not visible by the user character A140, and therefore is not displayed on the screen of the terminal A100. Groups may be formed in this game. When forming a group, if user character A is looking for group members, a group formation ring 130 is generated around user character A. The gist of the present invention is to display performance information of a terminal corresponding to a user character that has entered the generated group formation ring 130 with the purpose of joining the group.

In FIG. 1, a user character 140 on the screen invites other user characters to join a group, based on input of a group formation request and input of chat by the user of the terminal A100. Dialog "I'm looking for group members" is displayed on the screen as dialog spoken by the user character 140. The screens of terminals corresponding to user characters that are within a range in which the user character 140 is visible display the group formation ring 130 centered around the user character A140. Having seen the invitation to join the group and wishing to join the group, the user of the terminal C102 enters the user character 142 into the group formation ring 130, and performs input to request to join the group. Performance information 102c of the terminal C102 manipulating the user character C142 is displayed in an area at the top right of the user character C142 on the screen of the terminal A100. Similarly, performance information 104e of the terminal E104 is displayed in an area at the top right of the user character E144. The displayed performance information is "MP8/24 Mbps" in the case of the user character C142, and "MP10/10 Mbps" in the case of the user character E144. "MP10/10 Mbps" means that the machine power is 10 and the data communication rate with the network is 10 Mbps (mega bits per second). Note that machine power is a value set by the game creator so that respective machine powers of different terminals can be compared. The machine power is set based on factors such as the machine clock, and in the case of the machine being able to perform distributed processing with other devices, the machine power is set based on a total invokable parallel processing capability. The performance information of the user character B141 which has not entered the group formation ring 130 is not displayed. This is because it is pointless to display the performance information of a terminal corresponding to a user character that does not wish to join the group.

FIG. 3 shows the correspondence between information managed by the game server and graphics displayed by the terminals.

The terms user, user character, character, monster and map used hereinafter are defined as follows.

A user is the operator of a terminal, and a manipulator of a user character that corresponding one-to-one with the terminal.

A user character is an avatar that represents the user in the game, and that the user manipulates via the terminal. More specifically, each user character is a knight, a wizard, or the like that appears in the game, and moves around searching the world of the virtual space in the game according to manipulation via a terminal. Each one terminal can manipulate one user character.

Characters appear in the same way as user characters in the game, but are not manipulated by users. Characters act according to a pre-set algorithm, and their roles include the provision of helpful information to user characters.

Monsters also act according to a pre-set algorithm, and are enemies of user characters.

Maps represent backgrounds and landscapes in the game. User characters, characters and monsters are rendered on and move on maps.

The game server encodes and manages characters and monsters as in the encoded information 310 in the game server 110 in FIG. 3. The game server manages the status of each character, monster and so on, the status including the name and type of the user character and the coordinates of the user character on a map. For instance, for the character A in the encoded information 310 in FIG. 3, the character type is knight, the coordinates are (X1, Y1), the direction is south-west, the power is 89, and the action is attack. The game server manages this kind of information dynamically in real time for each user character, monster and so on.

Meanwhile, each terminal successively receives encoded data from the game server. The terminal performs rendition processing based on the received data and the client software of the terminal to render user characters, monsters and the like, and thus render a screen such as a display screen 300 in FIG. 3 on a display device of the terminal. Furthermore, when for instance input is performed to manipulate a user character based on a user operation, the terminal apparatus transmits the contents of the input to the game server. In the display screen 300 of the terminal A100 shown in FIG. 3, a user character A301, a user character B302, a user character C303, a monster α304 and a monster β305 are rendered based on encoded information that the terminal A100 receives from the server 110 via the network 120.

Figure 4:
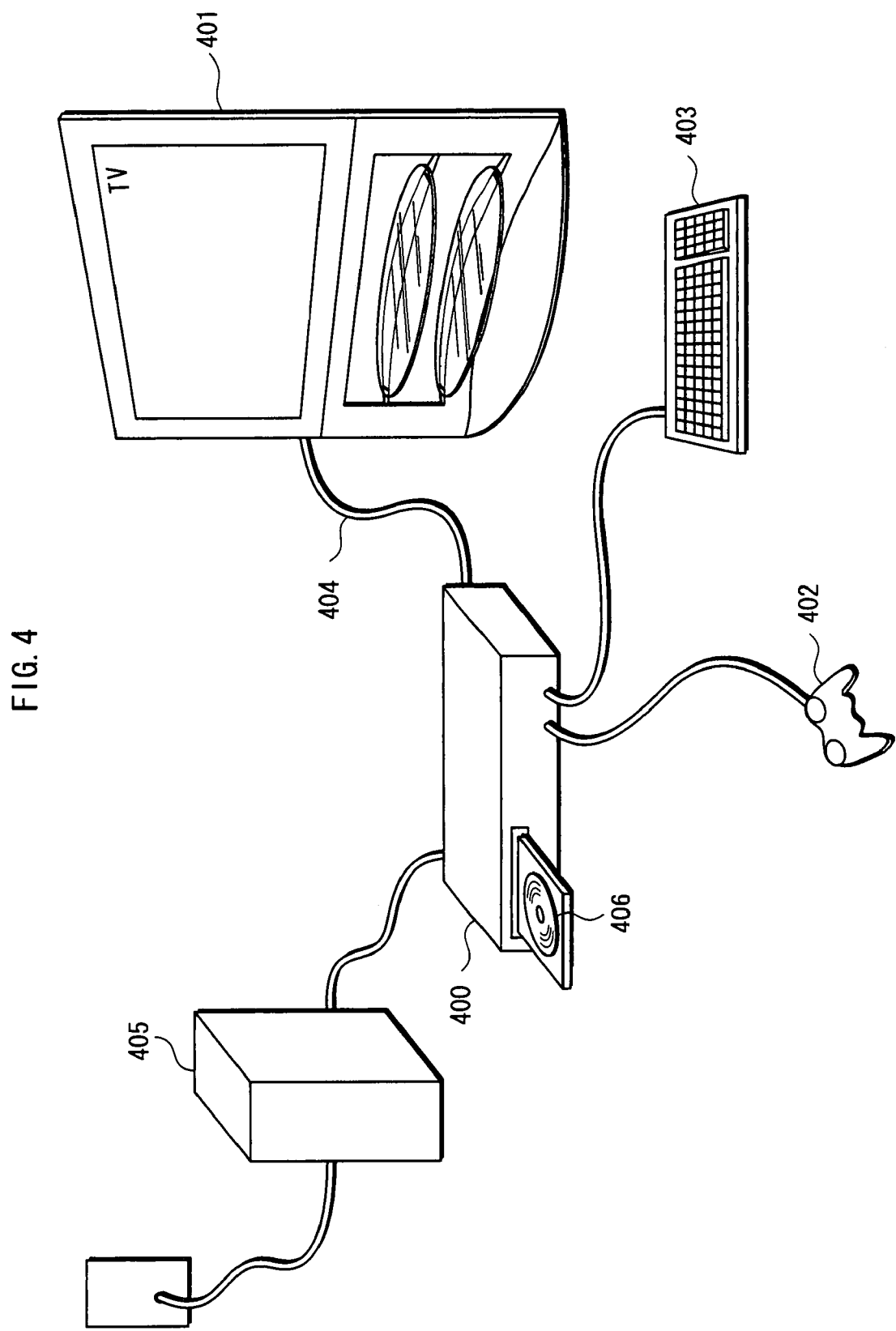
FIG. 4 shows the appearance of a terminal of the present invention and peripheral devices thereof.

FIG. 4 shows the appearance of a terminal and peripheral devices thereof.

The terminal is composed of a game machine 400, a television 401 that is a display device, a controller 402 that is an operation device, a key board 403, and an ADSL device 405 that is a network connection interface. Although the game machine 400 and the television 401 are connected by an AV cable 404 here, they may be connected by other means such as a LAN cable. An optical disc 406 stores thereon terminal-use software, and is loaded into the game machine 400 so that the game can be played. Here, the optical disc 406 is a DVD-ROM (DVD-read only memory). Note that the ADSL device 405 may be built into the game machine 400.

The controller 402 is a device for the user to manipulate his/her character. The keyboard 403 is used for inputting conversation when using a chat system in the game, and the keys thereof are also used as shortcut keys for purposes such as invoking magic and using items.

Figure 17:
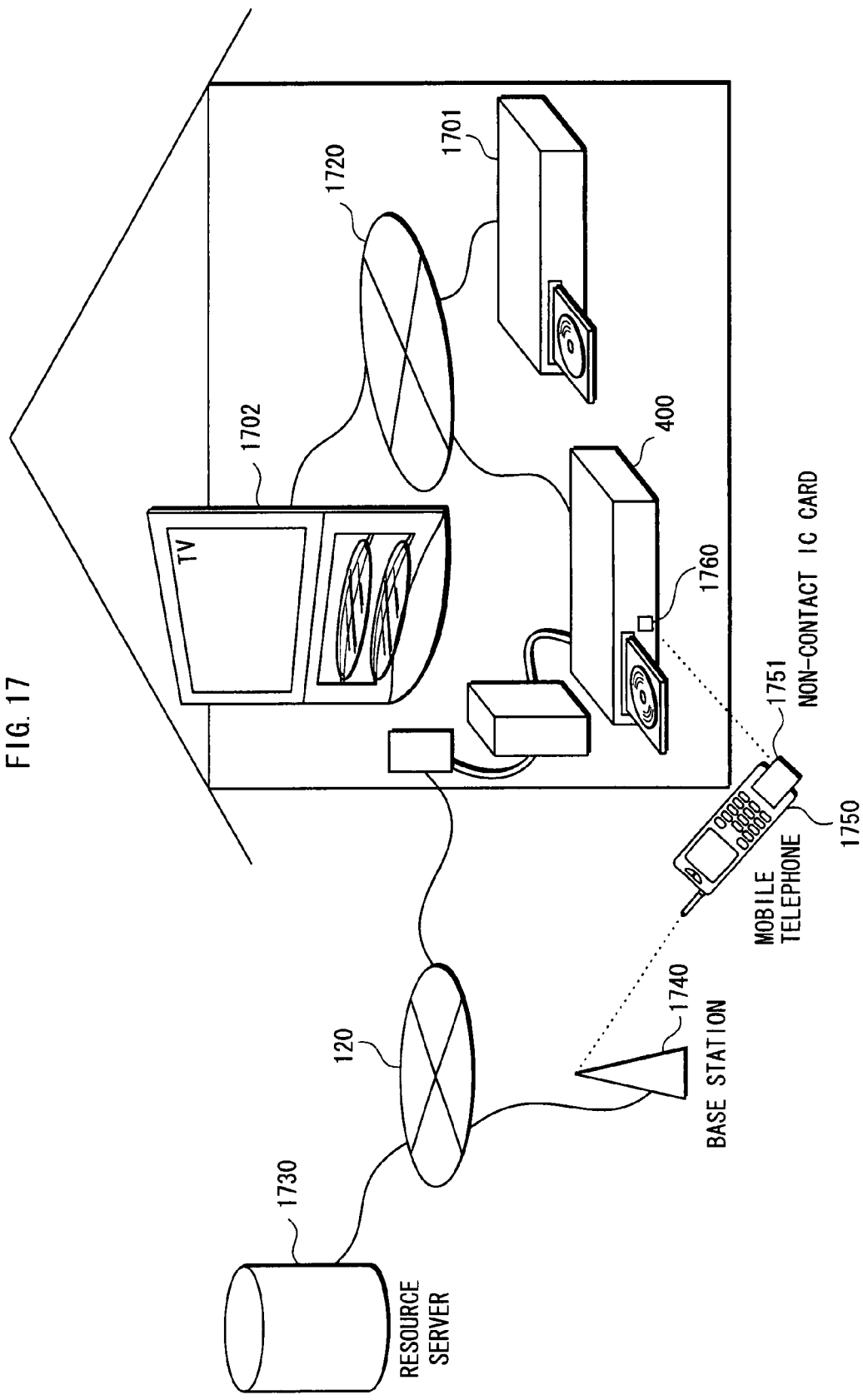
FIG. 17 shows a game machine 400 borrowing processing capability of another device.

As shown in FIG. 17, the game machine 400 forms a network with devices such as a television on a home network, and a resource server that the user subscribes to and is on an external network. The game machine 400 may perform distributed processing of part of the processing of the game.

FIG. 17 shows a network formed so that the game machine 400 can perform distributed computing with other devices. The game machine 400, a television 1700 and a DVD player 1701 are connected to each other via a home network, and each have parallel processing capability that makes distributed computing possible. The game machine 400 shares the processing of the game with the television 1700 and the DVD player 1701. In the case of a main device borrowing or invoking processing capability from a sub device for processing in this distributed computing, the following expressions are used hereinafter. For instance, assuming that the parallel processing capability of the game machine 400 that is the main device is 2 units, the parallel processing capability of the television 1700 that is a sub device is 3 units, and the parallel processing capability of the DVD player 1701 that is a sub device is 2 units, the game machine 400 is capable of invoking a total of 7 units (i.e., its own 2 units in addition to the 3 units of the television 1700 and the 2 units of the DVD player) for game processing. Note that the total number of the processing capability that the main device can invoke is of course different when the sub devices are performing other processing in parallel. When the processing capability number that the sub devices can provide changes, the total number of the processing capability that the main device can invoke also changes.

The game machine 400 is also able to borrow processing capability from an external resource server 1730, and is able to execute game processing in the same way as the devices connected to the home server 1720.

By using the processing capability of other devices as supplementary processing capability, the overall processing capability of the game machine 400 is improved.

This processing uses a technique relating to conventional distributed processing.

Note that the external resource server 1730 is used by, for instance, establishing a rental contract with the resource server 1730 while a usable non-contact IC card 1751 is in a loaded state in a mobile telephone, and having the non-contact IC card 1751 store information such as address information, a usable resource area, and a processing capability number. The non-contact IC card 1751 may communicate with a card data read unit 1760 of the game machine 400 so as to cause the game machine 400 to recognize the address and usable resources of the resource server 1730 in order to perform parallel processing.

Figure 5:
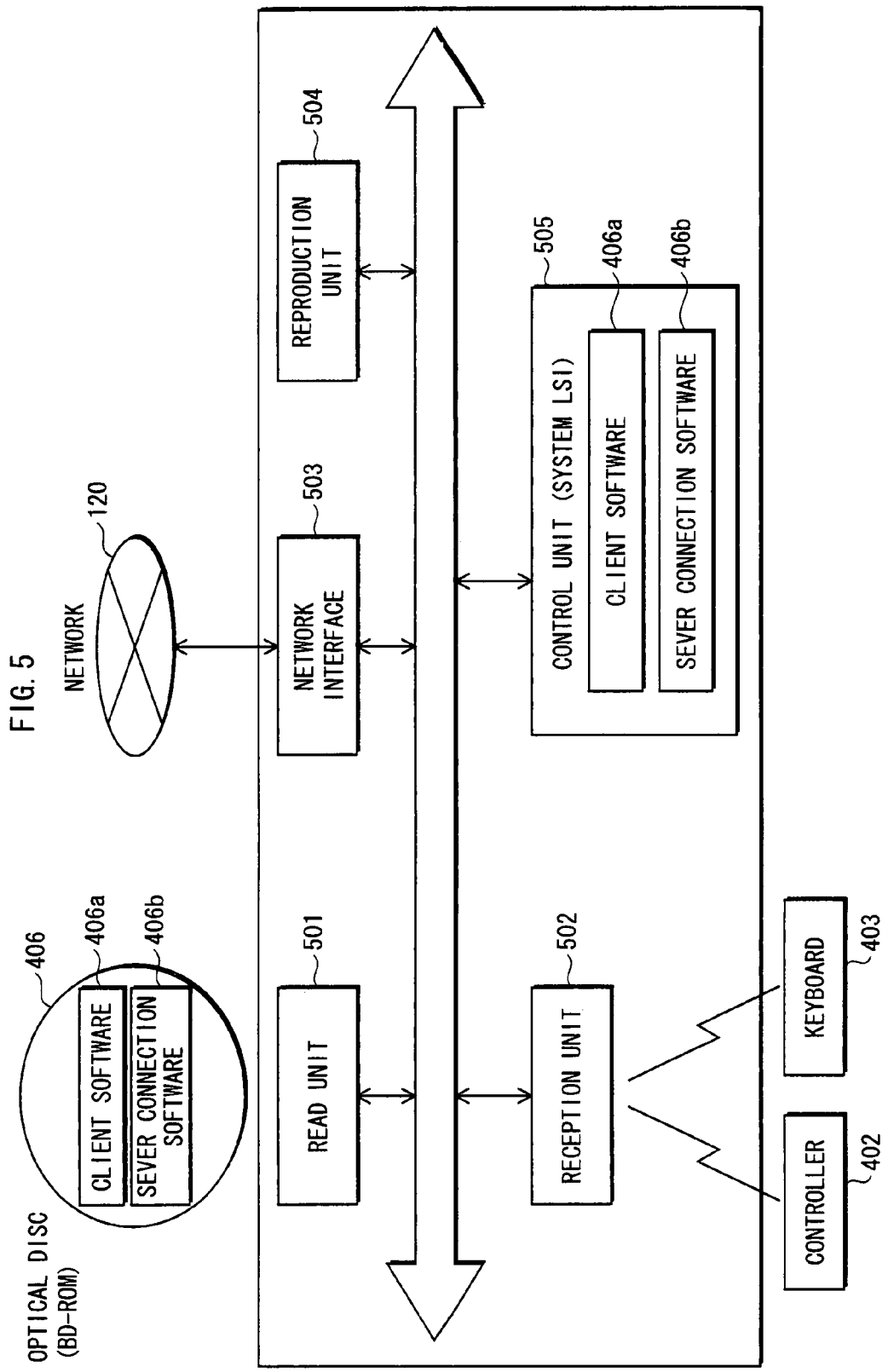
FIG. 5 is a function block diagram showing the structure of the terminal of the present invention.

FIG. 5 is a function block diagram of the game machine 400. The game machine 400 is composed of a read unit 501, a reception unit 502, a network interface 503, a reproduction unit 504, and a control unit 505.

The read unit 501 is composed of a drive mechanism for driving the optical disc 406 and reproducing a signal, and a signal processing unit for demodulating the reproduced signal to obtain digital data. The read unit 501 has a function of converting data read from the digital disc 406 into digital data. Recorded on the optical disc 406 is the client software 406a and game server connection software 406b. Here, the read unit 501 is a DVD-ROM drive or the like.

The reception unit 502 has a function of receiving operation input from the user via either of the controller 402 and the keyboard 403, and transmitting the contents of the received input via the network interface 503.

The network interface 503 has a function of connecting to the network 120 and exchanging data with the game server, and a function of transmitting a user operation to the server via the network 120, receiving encoded information from the server, and transmitting the received encoded information to the reproduction unit 504. The network interface 503 also performs data communication between a device on the home network or a device on the external network in the case of such a device executing game processing in parallel. In addition, the network interface 503 has a function of obtaining information relating to the resource server 1730 on the external network from the non-contact IC card 1751 so that the resource server 1730 can be used.

The reproduction unit 504 has a function of converting digital data demodulated by the read unit 501, or encoded information received from the game server, into graphic information, and transmitting the graphic information to the television 401 that is a display apparatus to reproduce the graphic information. The reproduction unit 504 also has a function of converting digital data including background music of the game loaded into the terminals, into audio data, and having a speaker attached to the television reproduce the audio data. As one example, the audio information is data in an MPEG format, and the graphic information is in a bitmap format or a polygon format.

The control unit 505 is a system LSI composed of a microprocessor, a RAM (random access memory) and a ROM (read only memory). The control unit 505 has a function of executing the client software 406a and game server connection software 406b read from the optical disc 406 by the read unit 501. Furthermore, the control unit 505 stores information including the CPU clock and video card performance of the terminal, and the network communication rate. Note that when distributed computing is possible, the control unit 505 calculates the total number of the processing capability that can be invoked by distributed computing, and stores the detected total number of the processing capability in the RAM. If the total number of the processing capability changes, the control unit 505 updates the stored information. In addition to the stored total number of the processing capability that can be invoked, the control unit 505 also stores a number indicating to processing capability that can be invoked from the external network.

The client software 406a includes graphic data of characters necessary to execute the game in the terminal, music data, and program data necessary to perform processing in the game.

The game server connection software 406b has network address information of the game server on the network 120. The terminal is usually connected to the game server, and the game server connection software 406b includes data for processing to establish communication of data relating to the game.

Figure 6:
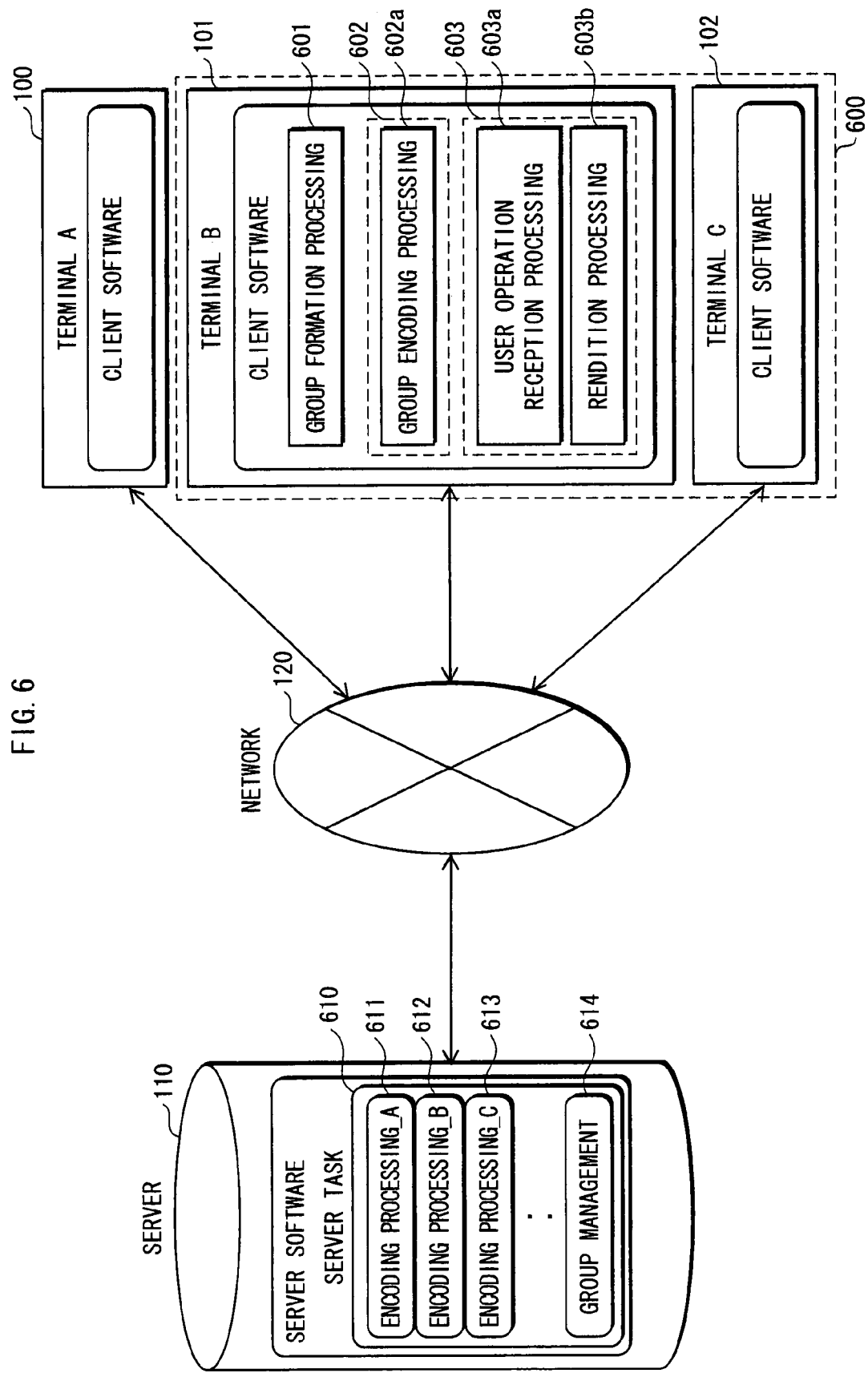
FIG. 6 show processing performed by the terminal of the present invention and a game server.

FIG. 6 relates to processing in the game server 110, terminals A100, B101 and C102, and terminals thereamong that have formed a group.

The game server 110 and the terminals A100, B101 and C102 are corrected to each other via the network 120, and exchange encoded information and dynamic information. The encoded information is transmitted to the terminals from the gamer server 110. As described earlier, the encoded information is user characters, monsters, and the like that are displayed by the terminals. The dynamic information is information transmitted from a given one of the terminals to the game server 110 when the user performs input relating to the user character corresponding to the given terminal. Here, the contents of the input are transmitted.

The user character of the terminal A100 is playing the game individually, while the user character of the terminal B101 and the user character of the terminal C102 have formed a group 600. Although FIG. 6 shows details only of the processing performed in the terminal B101, the terminal A100 and the terminal C102 performs approximately the same processing.

The terminal B102 performs group formation processing 601, group encoding processing 602a, user operation reception processing 603a, and rendition processing 603b.

The group formation processing 601 is processing that a terminal performs only when the user character corresponding to the terminal forms a group with another character.

The group encoding processing 602a is encoding and management processing performed only between user characters that have formed a group, instead of being performed by the server. This processing that is performed only between group members is referred to as a group task 602, and is described in detail later. The group encoding processing is performed by a terminal that has a higher performance among terminals belonging to the group, and therefore there are terminals that do not perform the group encoding processing. When there is no terminal in the group that has sufficient performance to undertake the group encoding processing 601, the game server 110 performs the group encoding processing 601.

The user operation reception processing 603a is processing of input made by the user via the controller 402 or the keyboard 403. The rendition processing 603b is processing for displaying a virtual space of the game on a display screen of the terminal, based on encoded information received from the server 110. The user operation reception processing 603a and the rendition processing 603b are referred to as a unique task 603 since they are unique to the terminal B101.

The server 110 is a computer that includes a ROM, a RAM and a CPU (central processing unit), and executes a server task 610. The server 110 performs processing for respectively encoding dynamic information transmitted from each terminal, and processing for transmitting collective encoded information to the terminals and processing relating to group management 614 when a group is formed. In FIG. 6, respective encoding processing relating to terminals A, B and C are denoted as encoding processing_A611, encoding processing_B612, and encoding processing_C613. Processing for the group management 614 includes processing for storing, in the RAM, group management information that lists the user characters that have formed the group.

FIG. 7 is a block diagram showing the structure of client software 406a loaded in the control unit 505 shown in FIG. 5.

As shown in the block diagram of FIG. 7, the client software 406a includes a group task execution unit 700, a unique task execution unit 710, a group formation unit 720, and group management information 730.

The group execution unit 700 includes a group encoding processing unit 701, and has a function of performing group task encoding processing. When the terminal is to execute a group task, the group task execution unit 700 performs processing relating to the group task.

The unique task execution unit 710 has a function of performing processing relating to the user character controlled by the apparatus in the game. The unique task execution unit 710 includes a user operation processing unit 711 and a rendition processing unit 712. The user operation processing unit 711 receives an operation from a user and, based on the contents of the input, performs processing in the game. The rendition processing unit 712 performs rendition processing based on encoded information received from the game server.

The group formation unit 720 includes a permission unit 721, a request unit 722, and a display information generation unit 723. The permission unit 721 has a function of giving permission to another user character to join a group that the terminal is forming. The request unit 722 has a function of requesting terminal performance information from a terminal controlling a user character that wishes to join the group. The display information generation unit 723 has a function of converting the received terminal performance information into display information, and having the display information displayed.

The group management information storage unit 730 has a function of storing information relating to user characters belonging to the group and information relating the terminals that control the user characters in the group, as shown in FIGS. 16A to 16B. Details of the group management information are given later.

The following describes a group task with use of FIG. 15. A group task is processing performed in a group that has been formed in the game.

FIG. 15 is an explanative drawing showing a scene in which rendition processing is being performed. The rendition processing relates to a group task displayed on the screen of the terminal.

The group task is a task applied only between user characters that have formed a group. The example in FIG. 15 includes encoding processing relating to transport (a boat 1500 in the present example) that the group shares, and a radar 1510 that enables the user to know the locations of members in the group and monsters that are enemies. The example in FIG. 15 also includes encoding processing of a sky layer for rendering a cloud 1520 and so on. Although not illustrated in FIG. 15, encoding processing such as magic to be cast cooperatively by the group members may be included in the group task. The contents of the group task are set by the manufacturer that provides the game, and may be other processing than the examples given here.

In the radar 1510, the group members are depicted by white circles 1511, 1512 and 1514, and the enemies are depicted by black circles 1513, 1515 and 1516. The radar 1510 is rendered to center around a user character A1501 of the terminal and include information of monsters and the like that are within a set distance outside of the range of the screen. In FIG. 15, the white circle 1511 corresponds to the user character A1501, the while circle 1512 corresponds to the user character B1502, and the black circle 1513 corresponds to a monster 1503. The position of the radar is rendered based on coordinate information of user characters and monsters included in encoded information transmitted from the server, centering on the white circle 1511 corresponding to the user character A1501 corresponding to the terminal in which the screen is rendered. An outline of the ship 1500 that is transporting the group is also rendered on the radar.

FIGS. 16A to 16D show the structure of group management information. As shown in FIG. 16A, the group management information includes member management information that relates to the composition of members of the group, and group task management information that shows allocation of group tasks.

As shown in FIG. 16B, the member management information includes names of user characters belonging to the group, and, corresponding to each user character name, a member type showing the status (member or leader) of the user character in the group, performance information of the terminal controlling the user character, and address information indicating the address of the terminal on the network. Since the only address information in the group management information is the address information of members belonging to the group, information relating to the group is transmitted only to the terminals whose address is included in the address information.

As shown in FIG. 16D, the terminal performance information is divided into data processing capability, rendition processing capability, and network capability. The network capability is the communication speed between the network and the terminal. FIG. 16D shows one example of the terminal capability. The terminal A forms a network such as home network and a network with external terminals. The terminal A is able to process faster by distributing processing that it must perform to devices on the internal network and the external network.

As shown in FIG. 16D, with respect to the data processing capability of the terminal A, a local terminal processing capability that is the processing capability of the terminal itself is 5, an internal network processing capability that is the processing capability of the internal network is 2, and an external network processing capability that is the processing capability of the external network is 3. Thus the total data processing capability of the terminal A is 10. Furthermore, the image processing capability is basically the rendition processing capability of the terminal, and since it is based only on the capability of the local terminal which a value of 5 and the other values are 0, the total capability value of the video processing capability of the terminal A is 5. Furthermore, since the network processing capability is 4, the overall capability of the terminal A is 19. This value 19 is stored as the performance information of the terminal A as shown in FIG. 16B, and is displayed on the display screen of a user terminal whose user is attempting to form a group, so that the user thereof is able to see the performance information. Note that the values of the capabilities are determined arbitrarily by the manufacturer of the game so that the difference in capabilities between a given terminal and another terminal is clear.

Here, the data processing capability is set based on the CPU clock such that the data processing capability is 1 if the CPU clock is 0 GHz to 0.5 GHz, the data processing capability is 2 if the CPU clock is 0.5 GHz to 1.0 GHz, and so on. The video processing capability is set to reflect the VRAM (video random access memory) in the graphics board of the terminal, such that the video processing capability is 1 in the case of the performance of the VRAM being 64 MB, the video processing capability is 2 in the case of the performance of the VRAM being 128 MB, and the video processing capability is 3 in the case of the performance of the VRAM being 256 MB. Furthermore, if expressed in terms of a capability value of the network transfer rate, the network capability is 1 if the network transfer rate is 1 Mbps or less, 2 if the network transfer rate is 1 Mbps to 5 Mbps, 3 if the network transfer rate is 5 Mbps to 10 Mbps, and 4 if the network transfer rate is 10 Mbps or greater.

As with FIG. 16C, the group task management information in FIG. 16A includes information showing which of the terminals and the game server performs each group task. For instance, in FIG. 16C, the terminal A performs a group task A, the terminal B performs a group task B, and the game server performs a group task C.

The information relating to the group is stored in the server and the terminals corresponding to the user characters in the group for as long as the terminals corresponding to the user character and the server form a group. Furthermore, the terminals each store detailed information regarding their own capability as shown in FIG. 16D.

The following uses FIGS. 8A to 8C and FIGS. 9A to 9C to describe an example of a user character in a game and the correspondence between the manipulation thereof and encoded information. The description makes reference to the correlation between the controller 402, encoded information managed by the game server 110, and screens displayed.

Figure 8A:
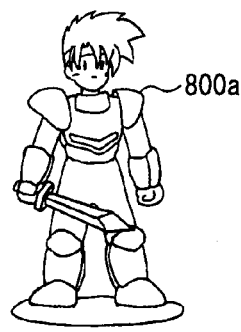
FIGS. 8A to 8C show operations for moving a user character.
Figure 8B:
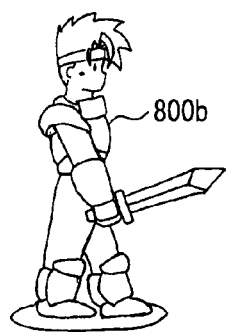
Figure 8C:
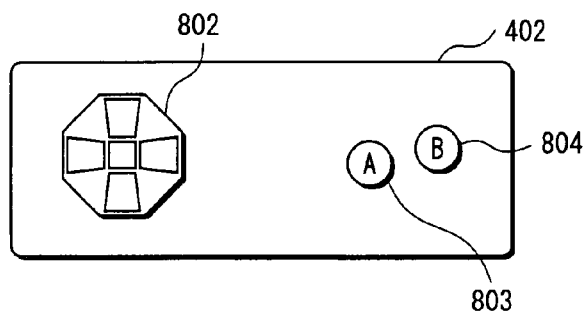

FIGS. 8A to 8C show a user character A moving from one position to another position. First, as shown in FIG. 8A, assume that the user character A800a is at a position (X1,Y1). The game server encodes and manages the name of the user character, the operational state and coordinates of the user character, and the like. Here, the name of the user character is A, the operation is "stationary", and the coordinates are (X1, Y1). Note that the present example shows only the parameters necessary for the present explanation, and other parameters such as character species are omitted here.

The user A operates the controller 402 shown in FIG. 8C, moving a cursor 801 by pressing an arrow key 802 in an arbitrary direction and then pressing an A button 803 when at the target position to which the character A800a is to move is reached, thus specifying the target position. The game server receives the operation contents, performs encoding processing, and re-transmits encoded information to a plurality of terminals including the terminal A.

The user character A800a moves toward the position specified by the user, in accordance with the client software. The game server 110 and the terminals also exchange data while the user character A800a is moving. Since the game server 110 is receiving this data, the encoded information in the game server 110 is updated as shown in FIG. 8B such that the operational state is "moving" and the coordinates are (X2, Y1). Here, the user character A800b is shown as in FIG. 9B on the screen of the terminal A as a graphic walking toward the coordinates (X2,Y1). Given that the terminals corresponding to the user characters within a visible range of the user character A also receive the encoded information from the game server, the user character A is displayed on these terminals in the same way. The user character A stops when it reaches the coordinates (X3, Y1), and the encoded information in the game server is updated to show that the operational state of the user character A is "stationary".

Figure 9A:
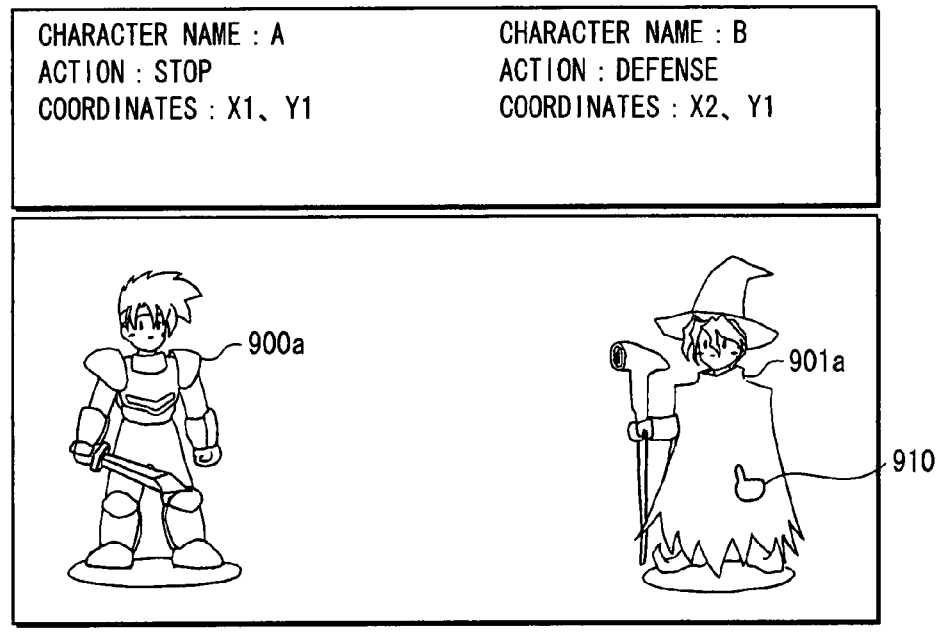
FIGS. 9A to 9C show operations relating to an attack by a user character on another user character.
Figure 9B:
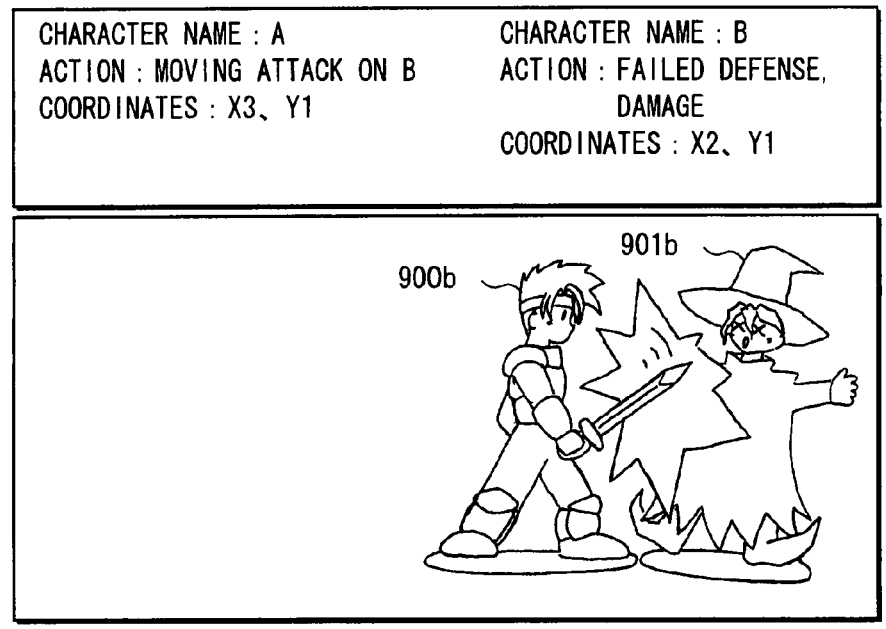
Figure 9C:
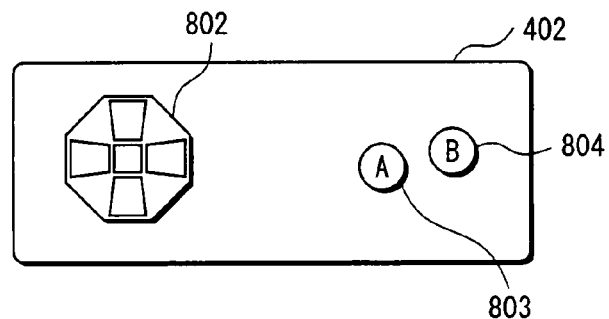

FIGS. 9A to 9C shows an example of server processing and a displayed screen when the user character A launches an attack on the user character B. The user A operates the arrow key 802 of the controller 402 to move the cursor over the user character B901a. Having confirmed that the cursor 910 is over the user character B901a, the user A presses an A button 803 to confirm that he/she will attack the user character B. The terminal A receives the operation for the user character A to perform a moving attack on the user character B, and transmits the received operation to the game server 110 as dynamic information. The game server 110 updates the encoded information based on the dynamic information, and transmits the updated dynamic information to the terminals. The terminals receive the transmitted encoded information and perform rendition.

FIG. 9B shows an example of the instant at which, based on the above results, the user character A900b attacks the user character B901b. In the game server the operation of the user character A900b is "attack", and the operation of the user character B901b is "failed defense". As such the user character B901b receives damage. Furthermore, the terminals receive the encoded information of the characters A and B, and the terminals manipulating user characters within a range in the game world that are able to see the user characters A and B also perform display according to the encoded information.

Given that the user character A900a that was at the coordinates (X1, Y1) has moved to the coordinates (X2, Y1) in order to attack the user character B due to attack input by the attack input by the user A for the user character A900a to attack the user character B901a, the operation of the user character A in the game server during this time is "moving". Having moved to the coordinates (X3, Y1), the user character A900b attacks the user character B901b that is at the coordinates (X2, Y1). The user character B901b fails in its attempt to defend itself, and is damaged. Whether a user character fails or succeeds in defending itself depends on parameters of the user character, and the method of calculating this is determined in advance. When the user character B901b fails in defense, the operation of the user character B901b in the encoded information in the game server is updated to "failed defense, damaged".

Figure 10:
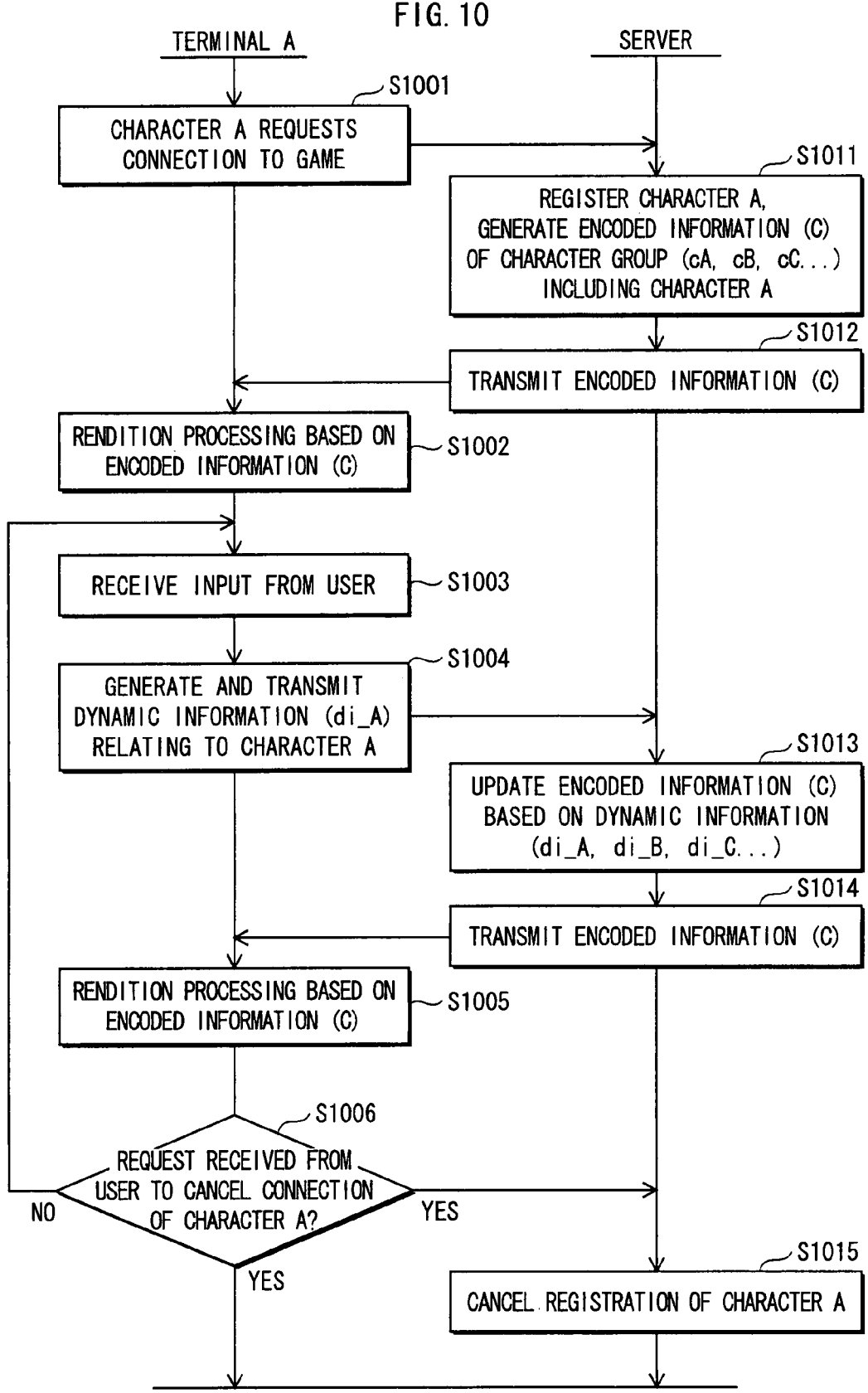
FIG. 10 is a flowchart showing operations from when a terminal A joins a game through to when the terminal A quits the game.

FIG. 10 is a flowchart showing exchange between the terminal A and the game server from when the user A participates in the game with the character A from the terminal A, through to when the user A quits the game.

First, according to input by the user to join the game, the terminal A makes a request for registration to the game server, such that the user character A is recognized as a user character in the game (step S1001). Having received the registration request from the terminal A, the game server registers the user character A controlled by the terminal A as a user character in the game. The game server generates encoded information (C) with respect to the user characters and monsters participating in the game at that time, including the registered user character A (step S1011). The game server transmits the generated encoded information (C) to the terminal A, which receives the encoded information (step S1012), and performs rendition processing based on the encoded information (C) and the client software (step S1002). When the rendition processing has ended, the user A is able to perform input with respect to the user character A. The terminal A receives input relating to the user character A from the user A via the controller 402 (step S1003). Having received an operation relating to the user character A, the user terminal A generates dynamic information (di_A) relating to the user character A, and transmits the dynamic information (di_A) to the game server (step S1004). The game server performs processing relating to user characters, including the dynamic information (di_A) of the user character A, and updates the encoded information (C) (step S1013). The game server transmits the updated encoded information to the connected terminals including the terminal A (step S1014). The terminal A performs rendition processing based on the newly transmitted encoded information (C) (step S1005). This kind of processing is repeated, thereby advancing the game. When the user A wishes to quit the game, and the terminal A input from the user A to cancel the connection with the game server 110 (step S1006: YES), the terminal A transmits a connection cancellation request to the game server 110. Having received the connection cancellation request from the terminal A, the game server cancels the registration of the user character A (step S1015), and ends communication with the terminal A, resulting in the user A quitting the game. Although a description has been given only of the relationship between the terminal A and the game server 110, the game server 110 continues to run 24 hours a day except for when it is down for maintenance or due to some kind of accident, and while running performs operations such as transmitting encoded information to terminals, receiving input contents from terminals, and updating encoded information.

Figure 12:
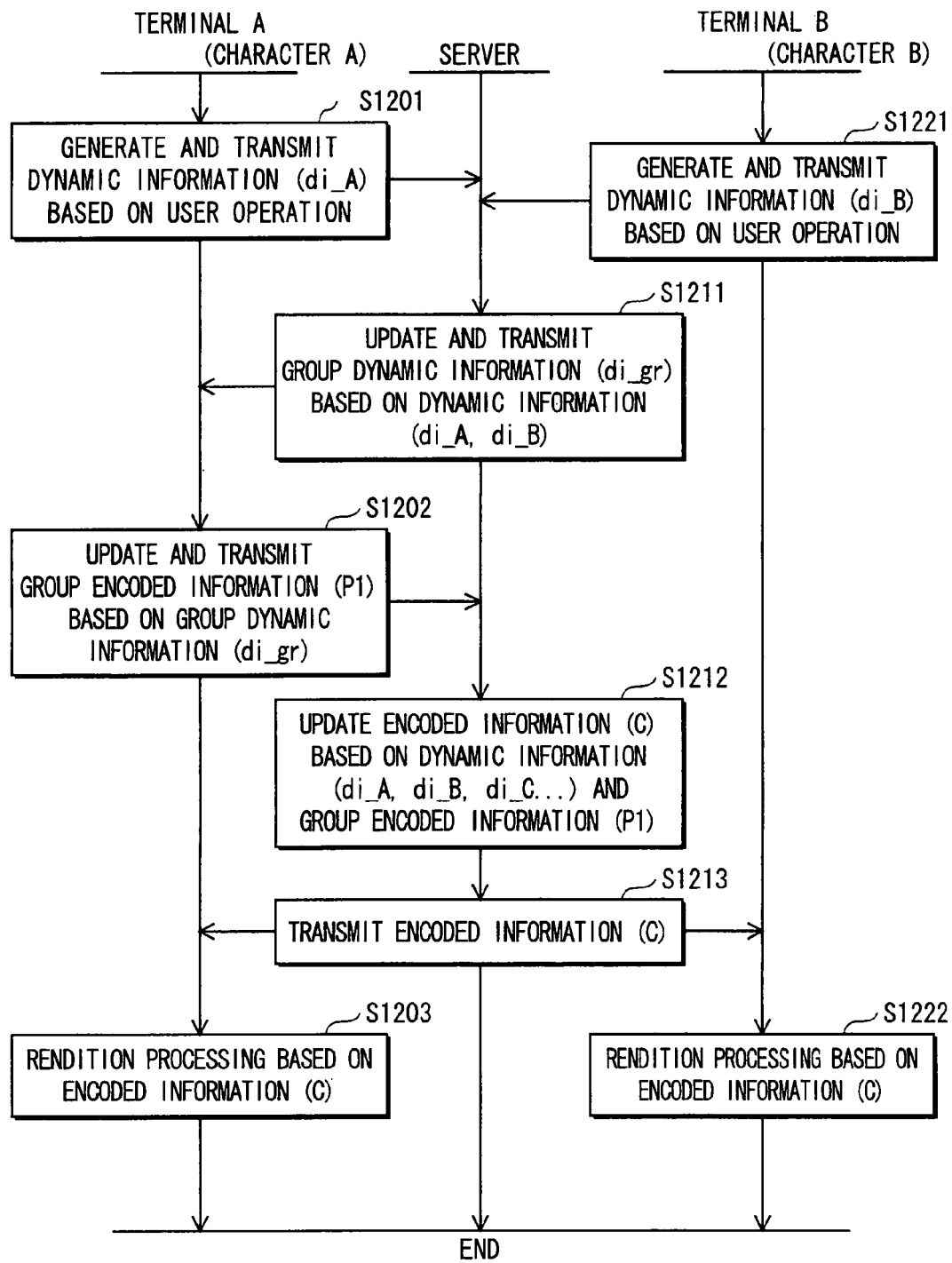
FIG. 12 is a flowchart showing exchange of dynamic information and encoded information performed between the terminal A and the server when the terminal A is in charge of a group task.

The following describes group formation and group task allocation with reference to the flowcharts in FIG. 12, FIG. 13 and FIG. 14.

FIG. 13 and FIG. 14 show screens rendered up to and when a group is formed. These two figures are used to describe group formation. FIG. 13 is an illustration rendered by the terminal A, and FIG. 14 is an illustration rendered by the terminal C. These illustrations show a scene when the user character A and the user character B have already formed a group, and the user character C is attempting to join the group.

According to input of a group formation request by the user A, the group formation ring 130 is rendered around the user character A1301. The group formation ring 130 is a ring of a predetermined radius renders that is centered around the coordinates of the user character A. Here, the user A may invite new members according to chat using the keyboard 403, in order to make it clear that he/she is looking for new group members. In the figures, the line "I'm looking for members" is displayed as dialog of the user character A1301, and the user character A1301 is indicating to other user characters that it is looking for group members. User C, who manipulates the user character C 1303 that has reacted to the request for members, manipulates the user character C so as to enter the group formation ring 130 to join the group.

The screen displayed by the terminal C at this time is as shown in FIG. 14. In this screen, a message window 1400 with the dialog "Do you want to join the group?" is displayed as a popup simultaneous to the user character C entering the group formation ring 130. The user C operates the controller to move the cursor 1401, and selects one of "YES" and "NO" shown in the message window 1400. If the user C selects "YES", a group participation request is transmitted to the terminal A, and if the user C selects "NO", the display of the message window 1400 ends and the user C continues to play the game as normal. When the user C selects "YES", the user C must wait for a response from the user A. When selecting "YES", the user C may use the keyboard to input dialog such as "May I join your group?" in order to clearly show his/her desire to join the group.

The terminal C corresponding to the user character C1303 that has entered the group formation ring 130 receives a transmission request for its performance information from a request unit 722 of the terminal A corresponding to the user character A1301, and transmits its stored performance information to the terminal A. Furthermore, when the user C performs input to show his/her desire to join the group, a message "C wants to join the group. Will you let him join?" is displayed on the screen of the terminal A as a message window 1330. At this time, graphics will overlap because another user character exists in front of the user character C1303. If this makes the user character C1303 difficult to see, the user character C1303 may be displayed in front on the screen so as to be easily seen by the user A, although this will disturb the perspective of the screen. Alternatively, the user character C1303 may be made to stand out by making the edges thereof a flashing white line.

Having received the performance information, the terminal A displays performance information 1303b at the upper right part of the user character C1303 to show MP (machine power) 18. Here, the performance information 1303b is obtained by converting a total value of information such as the clock count and the network communication rate to rendition information. This information is displayed such that the point of origin thereof is a position that is, for instance, a distance of t pixels in an x axis+direction and u pixels in a y axis+direction from the coordinates shown by the coordinate information of the user character C. This enables the performance information to be re-displayed as required if the user character C moves, and thus prevents a situation in which it is difficult to determine which user character the displayed performance information corresponds to. Having checked the performance information, the user A uses the cursor 1331 to select "YES" in the message window 1330 when the user character C1303 is permitted to join the group, or to select "NO" in the message window 1330 when the user character C1303 is not permitted to join the group.

The screen displayed by the terminal A in FIG. 13 also includes a group member list 1310 and a group task list 1320 in addition to the message window 1330.

The group member list 1310 includes names of user characters in the group, and attributes showing whether each user character is a group leader or a group member. Basically, the group leader is the person who originally initiated the formation of the group. The group leader may be changed anytime with the agreement of the group members. The group leader is basically a manager who ultimately finalizes how the group will act.

The group task list 1320 shows which device is in charge of performing each group task. A dash ("-") indicates that no device is in charge of a corresponding task, and that the server performs the task. FIG. 13 shows three group tasks: G_task A performed by the terminal A corresponding to the user character A, G_task B performed by the terminal B corresponding to the user character B, and G_task C performed by the game server. Although details of the contents of the group tasks are not shown in FIG. 13, examples of the allocated group tasks are encoding processing relating to the boat 1500 that is transporting the group and encoding processing relating to the radar 1510 shown in FIG. 15.

When the terminal is in charge of a group task is to be changed, the cursor 1331 is used to select the group task in the group task list 1320, and then select the user character corresponding to the terminal that is to be newly in charge of the selected group task. The group management information is rewritten at this time. If for instance G_task B is selected using the cursor and the user character A is then selected, the terminal performing G_task B will then be terminal A. Accordingly, the group management information is updated such that G_task B is also shown in correspondence with the name A of the user character A1303 corresponding to the terminal A.

Figure 11:
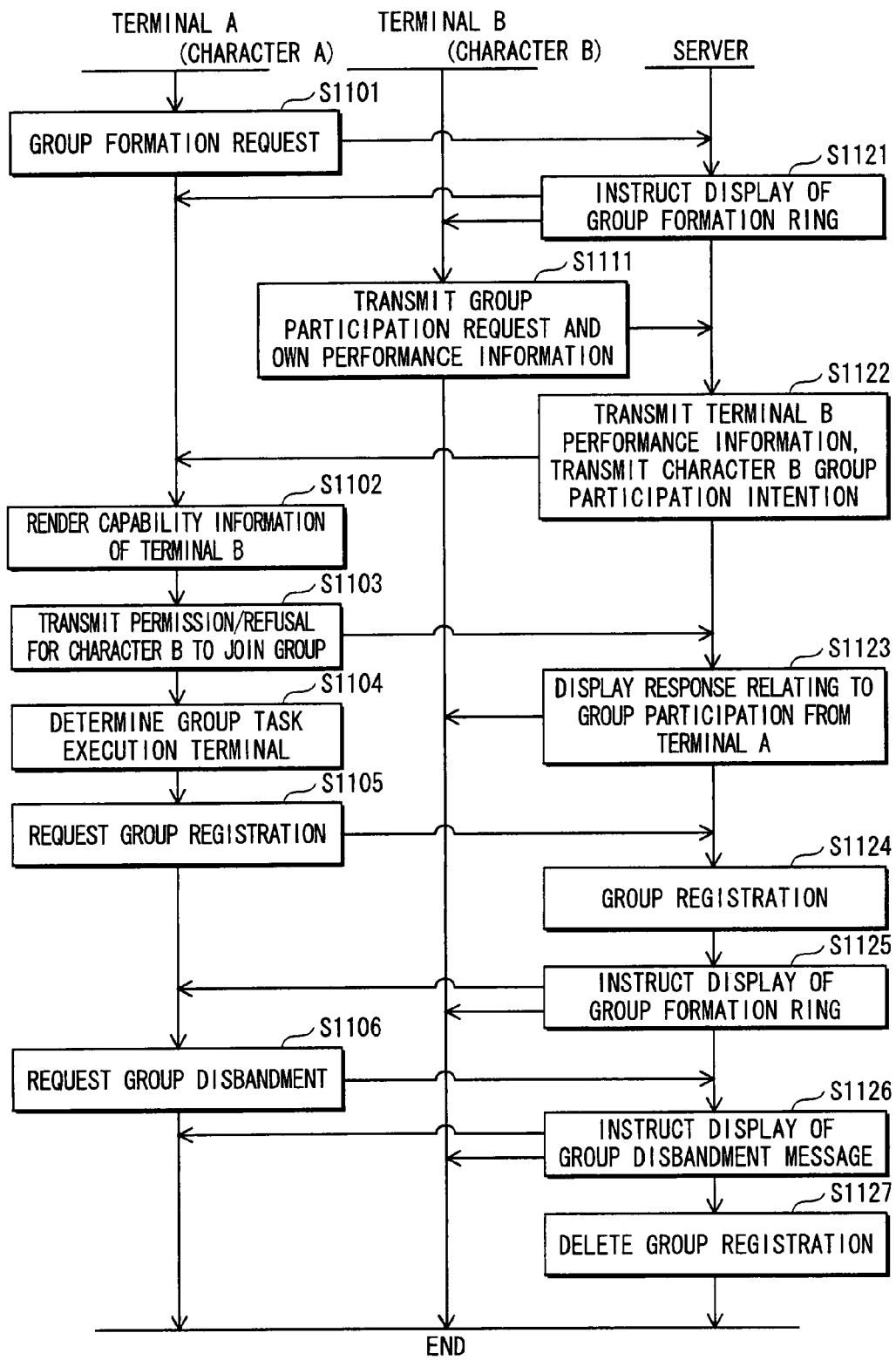
FIG. 11 shows a flowchart of when terminals A and B form a group.

FIG. 11 is a flowchart relating to operations by a terminal and the game server for forming a group and disbanding a group in the game.

FIG. 11 shows processing from when the user character A controlled by the user A of the terminal A wishes to form a group, the user character B wishes to join the group, a group is formed by the user character A and the user character B, and the formed group is disbanded. The user A manipulating the user character A wishing to form a group makes input to that effect via the controller 402 or the keyboard 403, and having received the input, the terminal A transmits a group formation request to the game server (step S1101). Upon receiving the group formation request, the game server transmits an instruction for displaying a group formation ring to each terminal (step S1121). The user B manipulating the user character B notices that the group formation ring 130 has been formed around the user character A, and performs input to show that he/she wishes to join the group. The terminal B transmits the input contents and the performance information of the terminal B to the game server (step S1111). The game server transmits the received desire to join the group the received performance information of terminal B to the terminal A (step S1122). The terminal A performs display showing that the user character B wishes to join the group, and also displays the performance information of the terminal B corresponding to the user character B such that the performance information is shown as corresponding to the user character B (step S1102). The user A checks the performance information of the terminal B, and performs input relating to whether or not the user character B is permitted to join the group. The terminal A transmits the input contents to the game server 110, and the game server 110 transmits, to the terminal B, information showing whether or not the user A has permitted the user character B to join the group (step S1123). The terminal B displays the contents of the received information, thus enabling the user B to know that permission has been given to join the group. Having permitted the user character B to join the group, the terminal A then, based on a user operation, determines allocation of group tasks to the terminals (step S1104). The terminal A then transmits a group registration request to the game server 110 (step S1105). Upon receiving the registration request, the game server 110 performs group registration (step S1124), and transmits, to each terminal, a transmission request to delete the displayed group formation ring and the terminal performance information (step S1125). As a result, a group is formed by the user character A and the user character B.

When the user characters in the group have finished acting as a group, the user A inputs a group disbandment request to the terminal A, and the terminal A transmits the desire to disband the group to the game server 110 (step S1106). The game server 110 transmits an instruction for displaying a message showing that the group has been disbanded, to the terminals A and B that correspond to the user character A and the user character B that were participating in the group (step S1126). The game server 110 then cancels the registration of the group (S1127). This results in the group composed of the user character A and the user character B being disbanded, and the processing ends.

FIG. 12 is a flowchart showing exchange of information such as encoded information and dynamic information in the case of the terminal A being in charge of a group task. In FIG.

12, the user character A corresponding to the terminal A and the user character B corresponding to the terminal B have formed a group.

The terminal A receives an operation to manipulate the user character A, and transmits the contents thereof to the server as dynamic information (di_A) (step S1201). Meanwhile, the terminal B also receives an operation to manipulate the user character B, and transmits the contents thereof to server as dynamic information (di_B) (step S1221). Having received the respective dynamic information from the terminals, the server generates group dynamic information (di_gr) based on the received dynamic information, and transmits the group dynamic information to the terminal A which is in charge of group task encoding processing (step S1211). Based on the received group dynamic information (di_gr), the terminal A generates group encoded information (P1), and transmits the group encoded information (P1) to the server (step S1202). The server encodes the received group encoded information and dynamic information received from other terminals unrelated to the group, thereby generating encoded information (C) (step S1212). The server transmits the generated encoded information (C) to the terminal A and the terminal B (step S1213). The terminal A performs rendition processing based on the encoded information (C) received from the server (step S1203). Similarly, the terminal B also performs rendition processing based on the encoded information (C) received from the server (step S1222). This ends the effects on the server and terminals when the terminal A is in charge of processing a group task.

Although in the preferred embodiment an example is given of an online fantasy RPG as the multi-participant application, the online game is not limited to this example. For instance, the present invention may be applied to a online meeting where some kind of collaborative work is performed, with the performance of terminals being displayed to assist in determining delegation of the work.

Furthermore, although only the total value of the performance of the terminal is displayed in FIG. 13 of the preferred embodiment, detailed parameters such as shown in FIG. 1 may be displayed. For instance, the values of the clock count of the terminal, the performance of the video card of the terminal, the network communication rate and so on may be displayed as is. This gives a wider basis for selecting members to join the group. Here, different colors may be used to display the pieces of performance information depending on differences therebetween, so that the pieces of performance information are easily distinguishable. Furthermore, when a terminal has sufficient extra capability to execute other processing besides the processing for the game being executed, the extra capability may be displayed as distributed processing capability.

In the case of a terminal having multiple CPUs, the performance displayed by the terminals may be the number CPUs. In cases such as the terminal performing grid computing that performs distributed computing, or cell computing that performs grid computing in real time, the performance may be the distributed computing processing power. The processing capability number may be, for instance, the number of parallel processing units in cell computing. Furthermore, the source from which the performance of the terminal can be invoked may be displayed such that it is distinguishable as being a client terminal, the home network, or the resource server. Here, distinguishable refers to changing the display color, the type of font, or the like.

Although the optical disc 406 is described as being a DVD-ROM in the preferred embodiment, it may instead be another type of recording medium such as a CD-ROM (compact disk read only memory) or a BD-ROM (Blue-ray disk read only memory).

Although the user characters and terminals are described as having a one-to-one correspondence in the preferred embodiment, a plurality of characters may be manipulated by a single terminal.

Furthermore, although the group formation ring 130 is used to form a group in the preferred embodiment, a group may be formed using a different means. For instance, a user may use a cursor to designate a user character with which he/she wishes to form a group. Here, the performance information of the terminal controlling the designated user character is displayed.

Although a destination to which a user character is to move is designated by a cursor in the preferred embodiment, a destination may instead correspond to the direction pressed on the arrow key, and the length of time the arrow key is pressed. In other words, for instance, while the user is pressing the left arrow of the arrow key, the user character continues to move the cursor in a leftward direction (from the point of view of the user), and then the user may press an attack button when he/she wishes to attack. Note that for instance the attack key may be the A button 803 of the controller 402.

In the flowchart of FIG. 11 showing group formation in the preferred embodiment, two user characters (the user character A and the user character B) form a group of user characters. However, the maximum number of user characters able to join a group is set by the provider of the game, and any number of user characters may join a group providing the maximum number is not exceeded.

In the preferred embodiment, any of the user characters in the group may leave the group at the discretion of the user manipulating that user character. If the terminal corresponding to the user character leaving the group is in charge of a group task, the group task may be handed over to the game server when the user character leaves, or the group leader may designate the group task.

Although the control unit 505 is described as being a system LSI in the preferred embodiment, this may instead be called an IC, an LSI, a super LSI or an ultra LSI, depending on the degree of integration. The control unit 505 may be a single chip that includes part or all of the reproduction unit 504 and the network interface 503.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

If a circuit integration technique to replace LSI appears due to a development of or derivation from semiconductor technology, integration of the function block circuits may be performed using that technique. As one example, bio-technology or the like may be applied.

Furthermore, the present invention may be a method for forming a group in accordance with the procedures described in the present specification, or a computer program that defines the procedures.

The terminal of the present invention can be used in a communications entertainment field in which multi-participant online games and the like are played via a network.

The invention claimed is:

1. A terminal of a plurality of terminals of a network system, the network system including the plurality of terminals and a server apparatus, each terminal of the plurality of terminals corresponding to a respective character of a plurality of characters that exist in a virtual space, said terminal of the plurality of terminals comprising:

a control unit operable to execute (i) server connection software to form the network system by connecting said terminal to the server apparatus, and (ii) client software;

a display unit operable to, in accordance with data stored in the sever apparatus and data stored in said terminal, utilize the client software after forming the network system to perform a display of a scene in the virtual space in which a first character corresponding to said terminal and a second character corresponding to another terminal of the plurality of terminals exist, such that said terminal determines actions of the first character, and such that the another terminal determines actions of the second character; and an updating unit operable to, when a user of said terminal or the another terminal performs an operation to request an association of the first character corresponding to said terminal and the second character corresponding to the another terminal with a same group, and before associating the first character and the second character with the same group, utilize the client software after forming the network system to update the display of the scene, such that performance information pertaining to the another terminal is displayed in correspondence with the second character, wherein the performance information provides (i) a central processing capability of the another terminal, (ii) a video processing capability of the another terminal, (iii) a communication amount per time unit capability of the another terminal, and (iv) a distributed processing capability of the another terminal, wherein, before associating the first character and the second character with the same group, the client software executed on the control unit of said terminal controls the updating unit of said terminal to update the display of the scene, such that central processing capability, the video processing capability, the communication amount per time unit capability and the distributed processing capability of the another terminal are visible to the user of said terminal and are visually distinguishable from each other, wherein said terminal executes a multi-participant application and further comprises a group task processing unit operable to perform a group task executed using distributed processing of terminals of the same group, wherein the distributed processing capability of the another terminal indicates a processing capability of the another terminal available to perform the group task executed using the distributed processing, and wherein the another terminal performs the operation to request the association of the first character corresponding to said terminal and the second character corresponding to the another terminal with the same group by transmitting a visual request to join the same group to said terminal, such that the user of said terminal is capable of viewing the performance information of the another terminal and is provided with a graphical menu for accepting and denying the request for the association so that the acceptance or denial of the request for the association can be based on the performance information of the another terminal.

2. The terminal of claim 1, further comprising:

a group formation unit operable to form the same group composed of the first character and the second character; and a reception unit operable to receive performance information pertaining to any terminal of the plurality of terminals other than said terminal, wherein, the received performance information pertains to the another terminal that determines the actions of the second character requested to be associated with the same group, and wherein the updating unit updates the display of the scene in accordance with the received performance information.

3. The terminal of claim 2, wherein the group formation unit includes:

a permission sub-unit operable to permit any character of the plurality of characters that is not associated with the same group to be associated with the same group; and a request sub-unit operable to make a request, to any other terminal, of the plurality of terminals, that determines actions of a character, of the plurality of characters, requesting to be associated with the same group, such that the any other terminal that determines the actions of the character requesting to be associated with the same group transmits performance information pertaining to the any other terminal that determines the actions of the character requesting to be associated with the same group.

4. The terminal of claim 3, wherein the same group formed by the group formation unit is a set of information that includes character identifiers and terminal identifiers, the character identifiers respectively showing characters, of the plurality of characters, associated with the same group, and the terminal identifiers respectively showing terminals, of the plurality of characters, that determine the actions of the characters associated with the same group.

5. The terminal of claim 4, wherein the group task is performed by the group task processing unit according to the distributed processing from among the terminals, of the plurality of terminals, that determine the actions of the characters, of the plurality of characters, associated with the same group.

6. The terminal of claim 5, wherein the group task is processed by, from among the terminals that determine the actions of the characters associated with the same group, a terminal having a higher performance.

7. The terminal of claim 1, wherein when the second character is associated with the same group, the updating unit updates the display of the scene, such that the second character and the performance information pertaining to the another terminal are displayed with priority over a character of the plurality of characters that is not requested to be associated with the same group.

8. The terminal of claim 1, wherein the updating unit updates the scene, such that coordinates at which the performance information is displayed in the virtual space maintain a predetermined relative positional relationship with coordinates at which the second character is displayed in the virtual space.

9. The terminal of claim 1, further comprising:

a storage unit operable to store performance information pertaining to said terminal; and a transmission unit operable to transmit the stored performance information to any other terminal of the plurality of terminals in response to a request therefrom.

10. The terminal of claim 1, wherein
the performance information provides hardware processing performance of the another terminal.

11. The terminal of claim 1, wherein
the performance information provides hardware performance according to distributed computing of the distributed processing between said terminal and the another terminal.

12. The terminal of claim 11, wherein
the updating unit updates the display of the scene based on the performance information, such that a hardware processing capability of said terminal and a hardware processing capability of the another terminal are displayed in respectively different forms.

13. The terminal of claim 12,
wherein the another terminal is either on the network system to which said terminal belongs, or is on an external network, and
wherein the updating unit updates the display of the scene, such that the hardware processing capability of the another terminal is displayed differently depending on whether the another terminal is on the network system to which said terminal belongs or is on the external network.

14. The terminal of claim 1,
wherein the network system that includes the server apparatus and said terminal executes the multi-participant application,
wherein said terminal is connected via the network system to a device that is capable of performing parallel processing, and
wherein said terminal performs user-side processing in the multi-participant application according to the distributed processing with the device.

15. A group formation method used by a given terminal of a plurality of terminals, the group formation method for forming a same group with another terminal of the plurality of terminals, the group formation method comprising:
executing server connection software to form a network system by connecting the given terminal to a server apparatus, and executing client software;
requesting a formation of the same group, by the given terminal, to associate a first character corresponding to the given terminal and a second character corresponding to the another terminal with the same group, the given terminal determining actions of the first character and the another terminal determining actions of the second character;
receiving, in response to the requesting of the formation of the same group, performance information pertaining to the another terminal;
displaying the received performance information pertaining to the another terminal in correspondence with the second character, before associating the first character and the second character with the same group; and
determining, with reference to the displayed performance information, whether or not to permit the second character to be associated with the same group,
wherein the performance information provides (i) a central processing capability of the another terminal, (ii) a video processing capability of the another terminal, (iii) a communication amount per time unit capability of the another terminal, and (iv) a distributed processing capability of the another terminal,
wherein, before associating the first character and the second character with the same group, the client software executed on the given terminal controls the displaying of the received performance information, such that central processing capability, the video processing capability, the communication amount per time unit capability and the distributed processing capability of the another terminal are visible to a user of the given terminal and are visually distinguishable from each other,
wherein the given terminal executes a multi-participant application and performs a group task executed using distributed processing of terminals of the same group,
wherein the distributed processing capability of the another terminal indicates a processing capability of the another terminal available to perform the group task executed using the distributed processing, and
wherein the given terminal requests the association of the first character corresponding to the given terminal and the second character corresponding to the another terminal with the same group by transmitting a visual request to join the same group to the another terminal, such that when a user of the another terminal accepts the visual request to join the same group the user of the given terminal is capable of viewing the performance information of the another terminal and is provided with a graphical menu for accepting and denying the request for the association so that the acceptance or denial of the association can be based on the performance information of the another terminal.

16. A non-transitory computer-readable recording medium having a program recorded thereon, the program causing a given computer terminal of a plurality of computer terminals to execute processing for forming a same group with another computer terminal of the plurality of computer terminals, the program causing the given computer terminal to execute a method comprising:
executing server connection software to form a network system by connecting the given terminal to a server apparatus, and executing client software;
requesting a formation of the same group, by the given computer terminal, to associate a first character corresponding to the given computer terminal and a second character corresponding to the another computer terminal with the same group, the given computer terminal determining actions of the first character and the another computer terminal determining actions of the second character;
receiving, in response to the requesting of the formation of the same group, performance information pertaining to the another computer terminal;
displaying the received performance information pertaining to the another computer terminal in correspondence with the second character, before associating the first character and the second character with the same group; and
determining, with reference to the displayed performance information, whether or not to permit the second character to be associated with the same group,
wherein the performance information provides (i) a central processing capability of the another terminal, (ii) a video processing capability of the another terminal, (iii) a communication amount per time unit capability of the another terminal, and (iv) a distributed processing capability of the another terminal,
wherein, before associating the first character and the second character with the same group, the client software executed on the given terminal controls the displaying of the received performance information, such that central processing capability, the video processing capability, the communication amount per time unit capability and the distributed processing capability of the another terminal are visible to a user of the given terminal and are visually distinguishable from each other, wherein the given terminal executes a multi-participant application and performs a group task executed using distributed processing of terminals of the same group, wherein the distributed processing capability of the another terminal indicates a processing capability of the another terminal available to perform the group task executed using the distributed processing, and wherein the given terminal requests the association of the first character corresponding to the given terminal and the second character corresponding to the another terminal with the same group by transmitting a visual request to join the same group to the another terminal, such that when a user of the another terminal accepts the visual request to join the same group the user of the given terminal is capable of viewing the performance information of the another terminal and is provided with a graphical menu for accepting and denying the request for the association so that the acceptance or denial of the association can be based on the performance information of the another terminal.

* * * * *